United States Patent [19]

Horike et al.

[11] 4,364,061
[45] Dec. 14, 1982

[54] INK JET PRINTING APPARATUS COMPRISING AUTOMATIC INK JET DEFLECTION ADJUSTMENT MEANS

[75] Inventors: Masanori Horike; Yutaka Ebi, both of Tokyo, Japan

[73] Assignee: Ricoh Company, Ltd., Tokyo, Japan

[21] Appl. No.: 235,184

[22] Filed: Feb. 17, 1981

[30] Foreign Application Priority Data

Feb. 28, 1980 [JP] Japan .............................. 55-24302
Feb. 28, 1980 [JP] Japan .............................. 55-24303

[51] Int. Cl.³ .......................................... G01D 15/18
[52] U.S. Cl. .................................................... 346/75
[58] Field of Search .................. 346/75, 140 R, 140 IJ

[56] References Cited

U.S. PATENT DOCUMENTS 4,286,273 8/1981 Horike .................................. 346/75

Primary Examiner—G. Z. Rubinson
Assistant Examiner—W. J. Brady
Attorney, Agent, or Firm—David G. Alexander

[57] ABSTRACT

After adjustment of a charging phase of ink droplets in an ink jet, printing of a line is accomplished by deflecting the ink jet through a number of incremental positions and applying a binary image signal to the ink jet during this time. The proper amount of deflection of the ink jet is adjusted between the above mentioned steps by sweeping the ink jet along an axis. A target electrode (80a) is provided along the axis with an edge thereof intersecting the axis. The ink jet deflection is stopped when an output of an integrating circuit (220) indicates that the ink jet reached the edge. An electric signal is produced indicating an amount of deflection force applied to the ink jet at the time it reaches the edge. A voltage amplification factor for deflecting the ink jet through the incremental positions is set in accordance with the magnitude of the electric signal.

11 Claims, 21 Drawing Figures

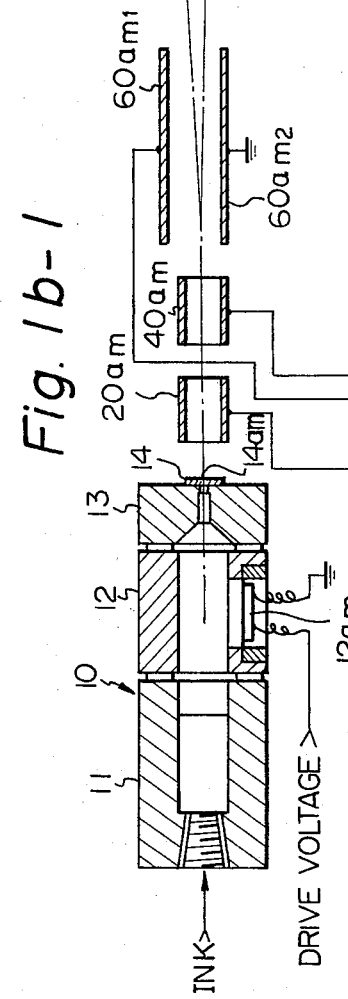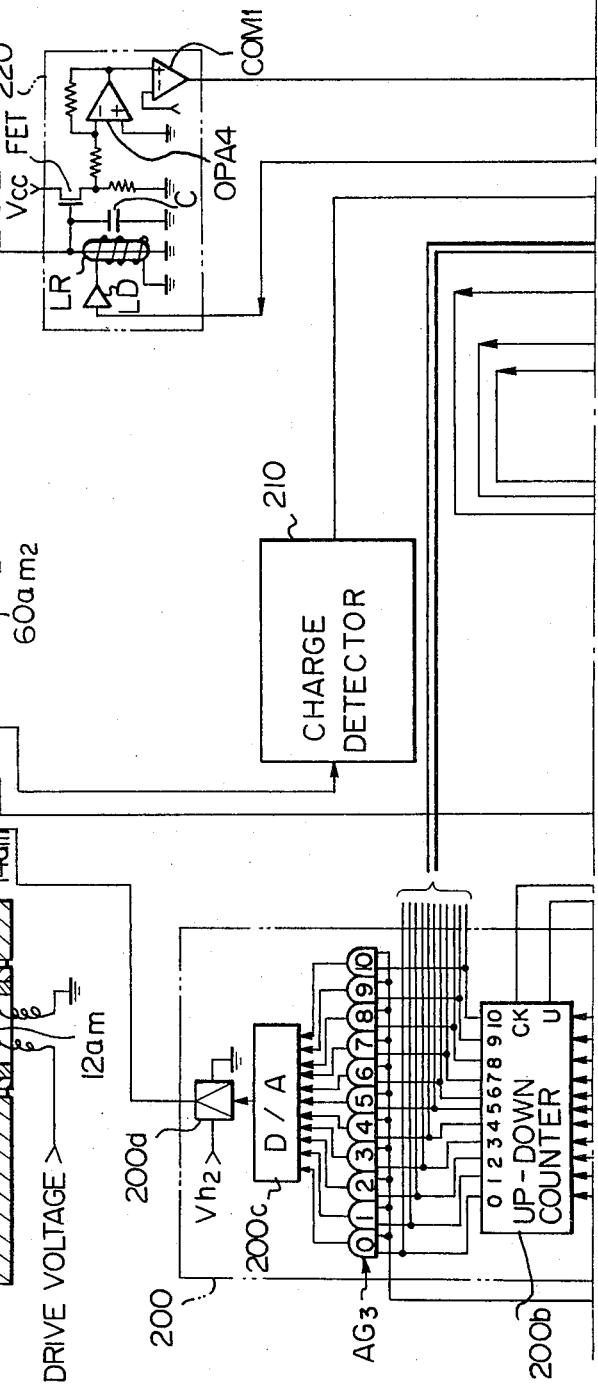

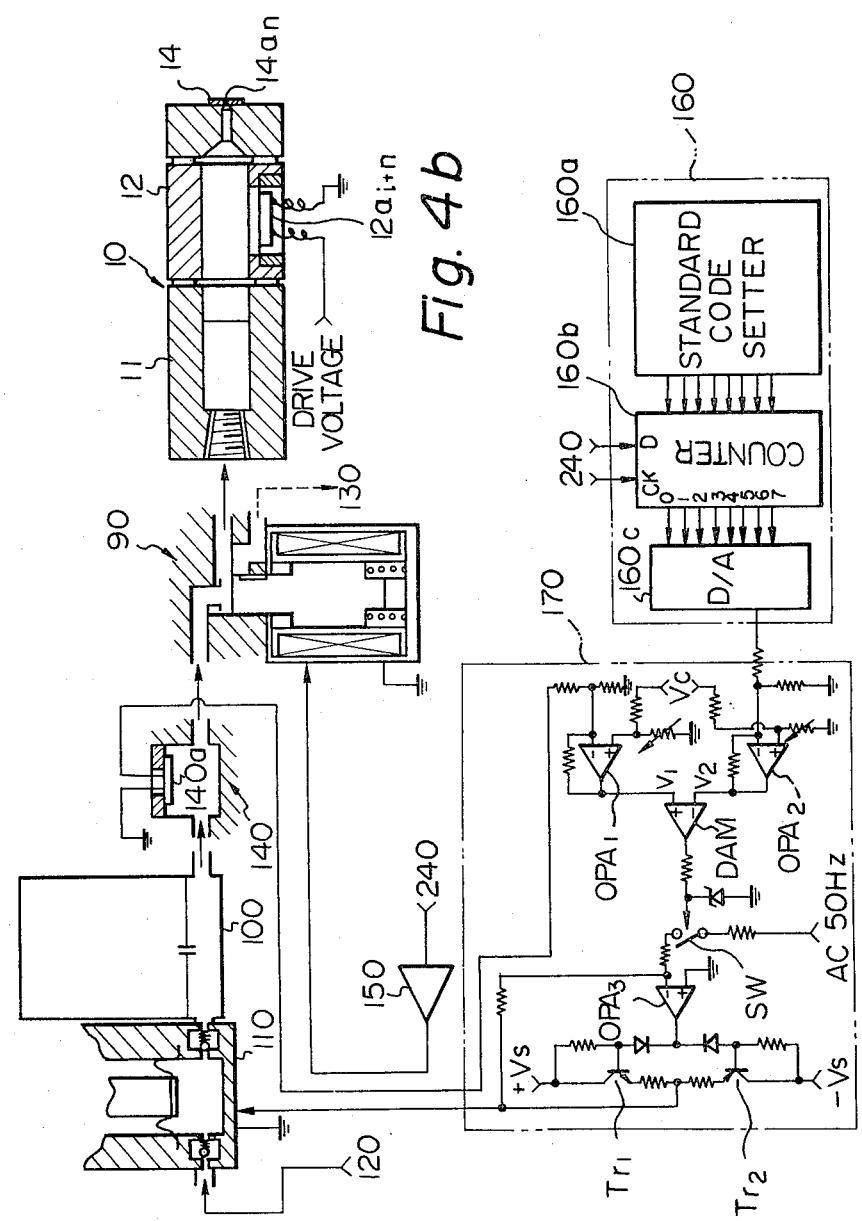

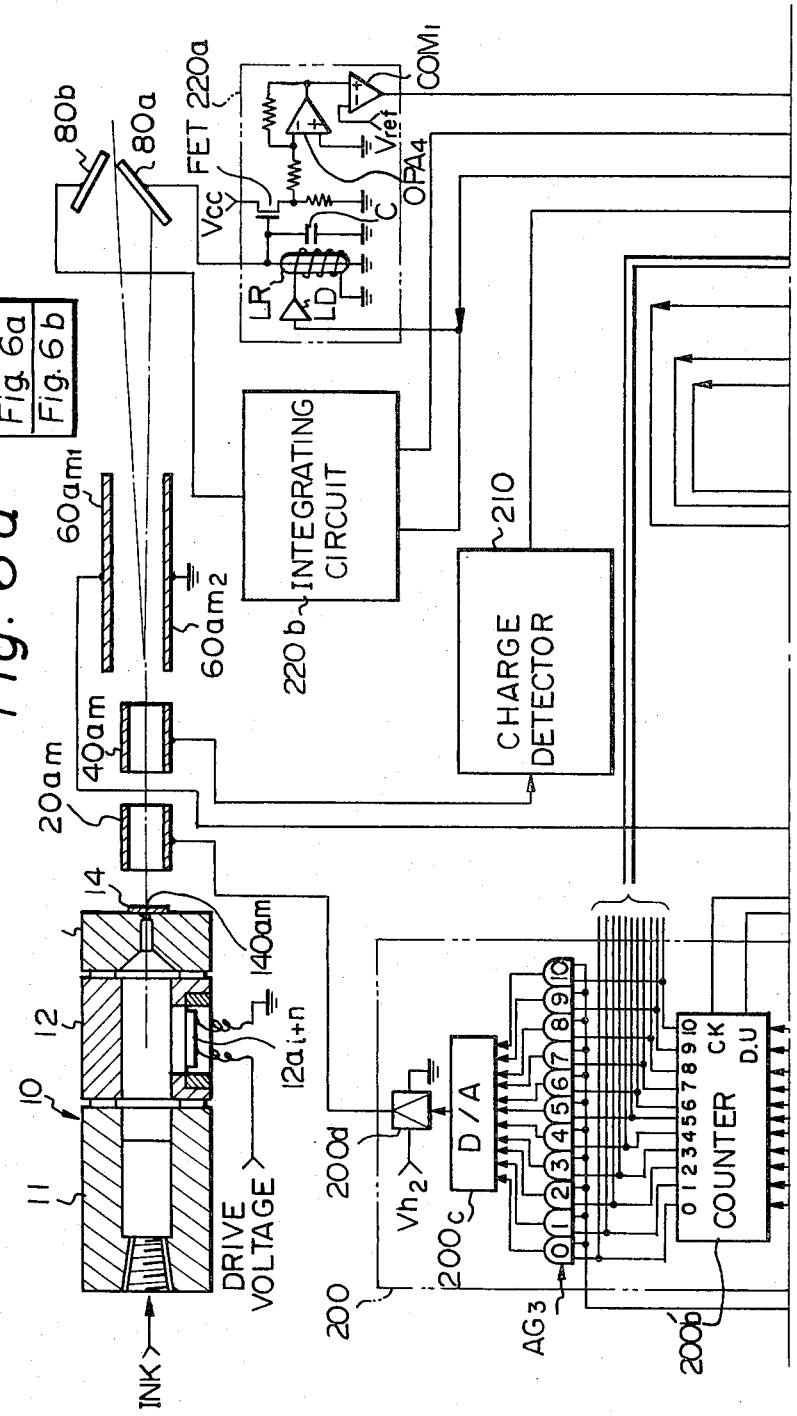

| Fig. 7 a | Fig. 7 b |

INK JET PRINTING APPARATUS COMPRISING AUTOMATIC INK JET DEFLECTION ADJUSTMENT MEANS

BACKGROUND OF THE INVENTION

The present invention relates to an ink jet printing or recording apparatus in which at least one nozzle ejects a jet of ink subjected to supersonic vibration and a charging electrode selectively charges the ink at a position where the jet separates into droplets whereupon deflecting electrodes deflect the charged droplets of ink causing them to impinge on a recording sheet.

Known ink jet recording apparatus of the type described may be classified generally into a two-value deflection control apparatus, a multi-value deflection control apparatus and a combined apparatus of the two mentioned. In the first or two-value apparatus, ink droplets for printing data are charged (or charged to a high level) while those which are not used for printing are left non-charged (or charged to a low level or to the opposite polarity) so that the recording droplets may be deflected to a large extent by a deflecting electric field to impinge on a recording sheet and the non-recording droplets may be captured by a gutter. Conversely, the non-recording ink may be deflected to a large extent to be captured by a gutter. In this type of apparatus, one nozzle is used for one picture element during the recording operation. In the second or multi-value apparatus, one nozzle is used for three or more picture elements (e.g. 5 mm and 40 dots, assuming 8 dots/mm) and recording droplets of ink are charged to three or more levels (e.g. 40 levels) to be deflected along three or more paths (e.g. 40 paths). In the third or combined apparatus, recording ink droplets are charged in the same way as in the multi-value process. However, this last-mentioned apparatus first deflects recording charged droplets using a deflecting electric field extending in the Y-axis direction so as to cause them to miss a gutter and then deflects them using another electric field in the X-axis direction in accordance with their charging levels, thereby printing out data in the X direction on a recording sheet with positional variations.

Meanwhile, ink to be ejected from a nozzle may be vibrated by any of three known systems: one which imparts pressure oscillation to the ink proper, one which imparts vibration in an intended direction of ink ejection to a nozzle plate having at least one ink ejection hole, and one which applies vibration bodily to an ink ejection head in an intended direction of ink ejection. The first system permits the use of a single nozzle plate having one ejection hole which is bonded to the leading end of a cylindrical electrostrictive vibrator, the other end of which is communicated with a pressurized ink supply box. It also permits the use of a nozzle plate having numerous ink ejection holes which is bonded to the front wall of a pressurized ink supply box in such a manner as to cover a slit provided to said wall of the ink supply box. One or more flat electrostrictive vibrators are mounted on one side wall of the box to impart vibrating pressure to ink inside the box. The second system employs a multi-apertured nozzle plate rigidly mounted to a pressurized ink supply box through an elastic member which is caused to vibrate by an electrostrictive vibrator. The third system drives a head bodily for oscillation by means of a motor, a solenoid device, an electrostrictive vibrator or the like.

In a recording apparatus of the type described, should the formation of ink droplets and the supply of charging voltages (in the form of pulses) to charging electrodes become out of synchronization, ink droplets would not receive the expected amounts of charge and this would result their dislocation on a recording sheet and therefore distort the image being reproduced on the recording sheet. To solve this problem, it has been proposed and put to practice to search for a proper charging phase for the ink droplets and thereby properly determine a timing for applying a charging voltage to a charging electrode as disclosed in Japanese Patent Publication No. 47-43450 and Japanese Patent Application No. 50-60131 which was laid open to public inspection. However, such a system fails in detecting whether or not the amount of deflection is proper although succeeding in determining whether or not the charge is appropriate. If the charging timing is proper, an excessive or deficient amount of deflection will contract or expand the resultant image and still cause distortion of the reproduced image in view of the feed pitch or speed of the sheet which is usually constant.

Generally, an amount of deflection $x_d$ of ink droplets can be expressed as:

$$x_d = K \cdot \frac{Q_j \cdot v_{dp}}{m_j \cdot S_{dp} \cdot v_j^2} \qquad \text{Eq. (1)}$$

where K denotes a constant which depends on the deflecting electrodes, $Q_j$ an amount of charge of the ink droplets, $m_j$ a mass of the ink droplets, $v_{dp}$ a deflecting voltage, $S_{dp}$ a spacing between opposite deflecting electrodes and $v_j$ an ejection velocity of the ink droplets.

It will be seen from Eq. (1) that the amount of deflection $x_d$ depends on so many factors that mere detection of the charge amount cannot determine the deflection amount and therefore cannot contribute to adequate deflection control. Even though the factors K, $V_{dp}$ and $S_{dp}$ in Eq. (1) may be constant (in fact, they can be maintained constant relatively easily) and the charge amount may be controlled to a proper value by a phase search, the factors $m_j$ and $v_j$ still exist as fluctuant factors. More specifically, those factors $v_j$ and $m_j$ are susceptible to variations in the viscosity of ink resulting from temperature variations of the ink and, also, to a slight variation in the property of ink from a state after storage for a long time to a state just after the replacement of the ink. It is therefore, desired to determine a proper amount of deflection by detecting an amount of deflection through the search for a droplet forming phase, rather than an optimum charging timing.

SUMMARY OF THE INVENTION

A primary object of the present invention is to provide a deflection control type ink jet recording apparatus equipped with a deflection detecting device for detecting a proper amount of deflection of ink droplets.

Another object of the present invention is to provide an ink jet recording apparatus of the type described which automatically sets an adequate amount of deflection.

A further object of the present invention is to provide an ink jet recording apparatus of the type described which adequately sets both an amount of deflection and a charging phase on the basis of a detection output of a deflection detecting device.

In order to achieve these objects, an ink jet recording apparatus according to the present invention includes at least one plate-like charge detection electrode located having one end adjoining a predetermined droplet deflection path and an integrating circuit connected to the electrode. In a preferred form of the present invention, in a case where ink droplets are charged to several different levels, the plate-like electrode has such a width that all of the charged droplets lower in charge level than those flying the aforementioned predetermined path impinge thereon or such a width that charged droplets higher in charge level than those flying the predetermined path impinge thereon without exception. With the former width, the plate-like electrode will be located on a low deflection side while, with the latter width, it will be located on a high deflection side. Suppose that ink droplets are charged to 40 different levels and that the path of droplets charged to the "k" level of the 1st to 40th levels constitutes the predetermined deflection path mentioned. Then, in the former case, the width of the plate-like electrode is predetermined such that all of the ink droplets charged to a level lower than the k level (charged to $k-1$ to 1 levels) impinge on the electrode, and one end of the electrode is located in such a position that droplets charged to the k level do not impinge but those charged to $(k-1)$ level impinge. In the latter case, the width of the plate-like electrode is predetermined such that all of the droplets charged to the $(k+1)$ to 40th levels impinge, and one end of the electrode is located in such a position that droplets charged to the k level do not impinge but those charged to the $(k+1)$ level do.

An ink jet printing apparatus embodying the present invention includes an ink ejection head for ejecting a jet of ink, charging means for electrostatically charging the ink jet and deflection means for electrostatically deflecting the charged ink jet, and is characterized by comprising sweep means for causing the ink jet to sweepingly deflect along an axis, target electrode means disposed along said axis and having an edge intersecting said axis, integrating circuit means connected to the target electrode means for integrating a voltage induced on the target electrode means, and control means for controlling the sweep means to cause the ink jet to sweepingly deflect along said axis toward said edge, sensing an output voltage of the integrating circuit means, controlling the sweep means to stop sweepingly deflecting the ink jet when the output voltage of the integrating circuit means has a predetermined value indicating that the ink jet has reached said edge and producing an electric signal having a magnitude corresponding to an amount of deflection force which the sweep means caused to be applied to the ink jet at a time the output voltage of the integrating circuit means has the predetermined value.

In accordance with the present invention, after adjustment of a charging phase of ink droplets in an ink jet, printing of a line is accomplished by deflecting the ink jet through a number of incremental positions and applying a binary image signal to the ink jet during this time. The proper amount of deflection of the ink jet is adjusted between the above mentioned steps by sweeping the ink jet along an axis. A target electrode is provided along the axis with an edge thereof intersecting the axis. The ink jet deflection is stopped when an output of an integrating circuit indicates that the ink jet reached the edge. An electric signal is produced indicating an amount of deflection force applied to the ink jet at the time it reaches the edge. A voltage amplification factor for deflecting the ink jet through the incremental positions is set in accordance with the magnitude of the electric signal.

It is another object of the present invention to provide a generally improved ink jet printing apparatus.

Other objects, together with the foregoing, are attained in the embodiments described in the following description and illustrated in the accompanying drawing.

BRIEF DESCRIPTION OF THE DRAWING

FIGS. 1b, 1b-1, 1b-2, and 1c are block diagrams indicating an electric circuit arrangement associated with the mechanical arrangement shown in FIG. 1a;

FIGS. 2c, 2c-1, and 2c-2, are flowcharts indicating the details of adjustment of deflection amount;

FIG. 4b is a circuit diagram of an electrical arrangement associated with the mechanical one shown in FIG. 4a;

FIGS. 6, 6a, and 6b are similar to FIG. 1b but show a modified embodiment of the present invention.

DESCRIPTION OF THE PREFERRED EMBODIMENTS

While the ink jet recording apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1A:
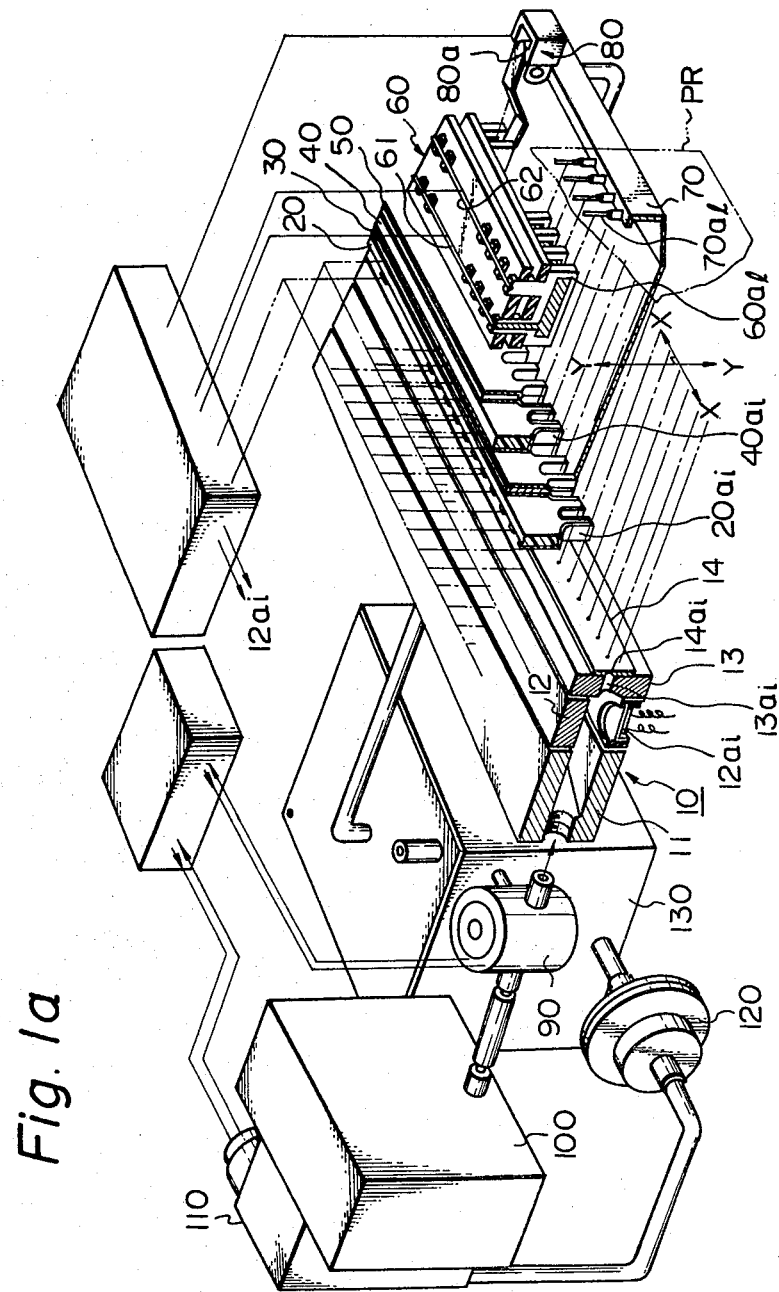
FIG. 1a shows in perspective form the mechanical arrangement of an ink jet printing apparatus embodying the present invention.
Figures 1, 1B, 2:
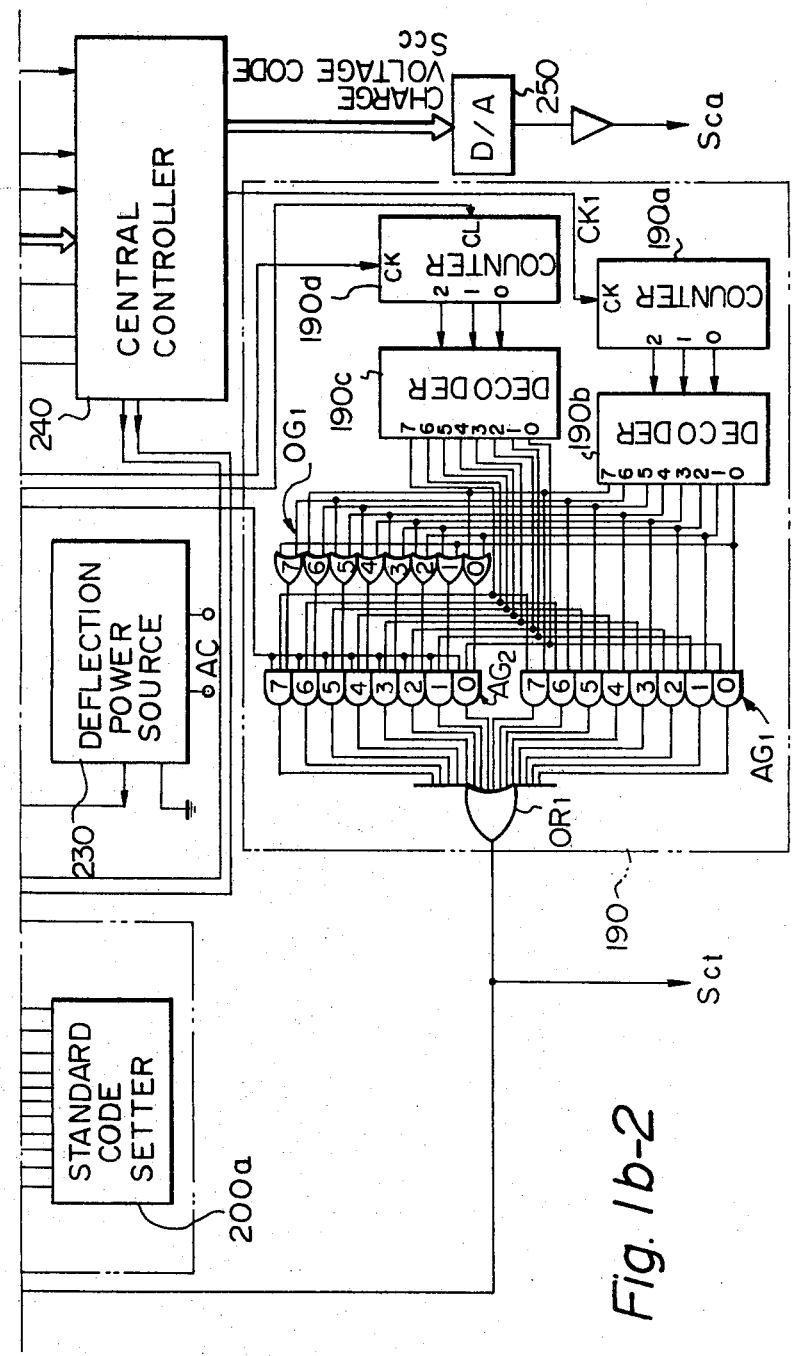
Figure 1C:
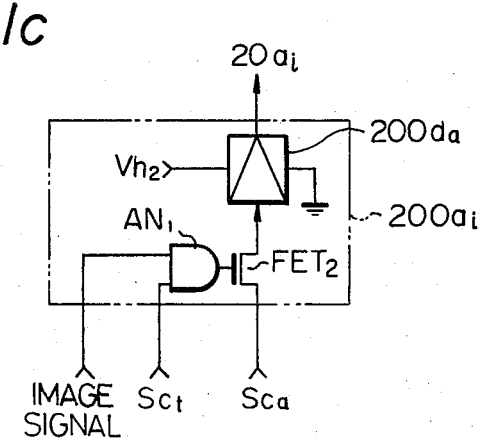

Referring to FIG. 1 of the drawing, there is shown the mechanical arrangement of a multi-nozzle type multi-value deflection ink jet recording or printing apparatus to which the present invention is applicable. FIGS. 1b and 1c show major electric arrangements of the ink jet recording apparatus individually. The mechanical arrangement includes an ink ejection head 10 which is generally made up of a member 11 defining a common ink passage therein, a vibrator support frame 12 defining a drive space therein and a nozzle plate holder 13. The support 12 carries a plurality of electrostrictive vibrators $12a_i$ rigidly on its bottom wall. When the vibrators $12a_i$ are driven synchronously with a constant frequency, pressurized ink within the space of the support 12 will be applied with pressure oscillation of a determined frequency. The nozzle plate holder 13 is formed with a plurality of ink passageways $13a_i$ at common intervals (e.g. 5 mm) throughout its recording width, the passageways $13a_i$ communicating with the internal space of the support 12. A nozzle plate 14 is bonded to a surface of the holder 13 and provided with microscopic holes $14a_i$ at locations spaced the same distance as the ink passageways $13a_i$. The nozzle plate 14 has forty-two such holes $14a_i$ for ink ejection arranged at a common interval of 5 mm, so that one ejection head can record through the width of $42 \times 5$ mm = 210 mm. Besides these holes $14a_i$, the nozzle plate 14 has an additional hole at a position outside the recording area to eject droplets of ink therefrom in the same way as from the other holes.

A charging electrode plate 20 is located in front of the nozzle plate 14 with respect to the intended direction of ink ejection from the latter. In front of the electrode plate 20, there is positioned a charge detecting electrode plate 40 via the intermediary of a shield plate 30. A deflecting electrode unit 60 is positioned in front of the electrode plate 40 via a second shield plate 50. A gutter 70 is positioned in front of the electrode unit 60. The electrode plates 20 and 40 and shield plates 30 and 50 have aligned inverted U-shaped recesses which are common in number to the holes $14a_i$ of the nozzle plate 14. The electrode plates 20 and 40 individually have printed electrodes $20a_i$ and $40a_i$ on the inner surfaces of their inverted U-shaped recesses. Each of these electrodes $20a_i$ and $40a_i$ extends out individually along the surface of the electrode $20a_i$ or $40a_i$. The deflecting electrode unit 60 has a plurality of deflecting electrode plates $60a_l$ each of which is deposited with deflecting electrodes by evaporation on the front and back surfaces thereof. The deflecting electrodes on each electrode plate $60a_l$ are individually connected to first and second conductive wires 61 and 62 respectively.

The gutter 70 has upright capturing members or catches $70a_l$ at spaced locations where droplets of ink ejected from the holes $14a_i$ of the nozzle plate 14 and left non-charged (at a non-recording level) reach as indicated by dot-and-dash lines in FIG. 1. While the catches $70a$ are shown in the illustrated embodiment to have one-to-one positional correspondence with the holes $14a_i$ of the nozzle plate for ejecting recording droplets, an electrode unit 80 for detecting deflection position is located within a range which ink droplets from a monitoring ejection hole $14a_m$ of the nozzle plate 14 will reach (outside the recording sheet area). The charging electrodes $20a_i$ are supplied with a staircase voltage waveform which may have forty stepwise or incremental variable levels, in accordance with image signals. Where a scan line is to be recorded or printed on a recording sheet for example, the 1st to 40th levels of voltage pulses will be coupled to the charging electrodes $20a_i$ in correspondence with the forty ink droplets ejected from the individual holes of the nozzle plate so as to charge the ink droplets to the 1st to 40th levels. These charged ink droplets will then be deflected by electric fields across the deflecting electrodes 60 from a high voltage power supply 230 and impinge on the recording sheet by way of the 1st to 40th deflecting paths and spacings between the catches $70a_l$. Thus, one ink ejection hole $14a_i$ is used to print forty dots along the array of the catches $70a_l$ (this direction will hereinafter be referred to as a horizontal scan or X—X direction). A recording sheet designated PR in the drawing is moved continuously or intermittently in a direction Y—Y which is perpendicular to the direction X—X mentioned. Since the application of charging voltages is controlled in accordance with image signals and since the recording sheet PR is fed in the manner stated, data will be recorded on the recording sheet PR in both the X—X and Y—Y directions in the form of dots.

An accumulator 100 supplies the head 10 with pressurized ink through an electromagnetic valve 90 and is in turn supplied with ink under pressure from an ink reservoir 130 through a filter 120. Ink captured by the gutter 70 is routed back to the reservoir 130. The electromagnetic valve 90 has three different ports; an inlet port communicated with the accumulator 100, an outlet port communicated with the member 11 and a third port communicated with the internal space of the ink reservoir 130. The valve 90 is of the type having a plunger (not shown) which will recede when the coil of the valve is energized so as to provide communication between the inlet and outlet ports while blocking the third port. When the coil is deenergized, the plunger of the valve 90 will be advanced by the action of a coil spring to a position where it closes the inlet port and communicates the outlet port with the third port. The reference numeral 110 denotes a pump which comprises a single electric coil (not shown), a plunger in the form of a polarized permanent magnet, a diaphragm and a spring-biased ball valve. The electric coil will be supplied with a current alternately in opposite directions such that the plunger is driven for reciprocation to suck and discharge ink alternately. The amount of ink delivery from the pump 110 depends on the switching frequency of the current supply thereto as well as the value of the current. The electrode unit 80 for detecting the deflection position comprises a plate-like charge detecting electrode $80a$, one side of which is open such that it catches all the ink droplets ejected from the monitoring hole $14a_m$ of the nozzle plate 14 regardless of the amounts of deflection. Additionally, of the forty levels of charged ink droplets, those which follow a predetermined deflection path and paths above the same will not impinge on the electrode $80a$ but those flying through the paths below the predetermined one will impinge on the electrode $80a$.

A print control section for charging phase search and deflection control is illustrated in FIG. 1b. A phase setting circuit 190 of the print control section includes a counter $190a$ which is supplied with clock pulses $CK_1$. The counter $190a$ is a ring counter that upcounts the clock pulses $CK_1$ to "8" and counts "9" as "0". More specifically, while clock pulses $CK_1$ are arriving in succession, the counter $190a$ counts them as "0", "1", "2", ..., "8", "0", "1", "2", ..., "8", "0", "1", "2" .. .. Output codes of this counter $190a$ are coupled to a decoder $190b$. Accordingly, each time a clock pulse $CK_1$ arrives at the counter $190a$, the decoder $190b$ shifts its high level or "1" output successively at its output terminals 0–7. Consequently, the individual output terminals 0–7 of the decoder $190b$ produce phase search pulses which have a common phase difference corresponding to the period $T_1$ of the clock pulses $CK_1$ relative to each other and have a duration of $T_1$ which is $\frac{1}{8}$ of a period $T_8$ of ink droplet production. These eight sets of phase search pulses are supplied to individual AND gates 0–7 of a first AND gate group $AG_1$ and also to paired OR gates 0–7 of an OR gate group $OG_1$, respectively. Outputs of the OR gates of the OR gate group $OG_1$ are fed to AND gates 0–7 of a second AND gate group $AG_2$. As will be described, during a phase search, all of the AND gates of the second group AG$_2$ are closed and a selected one of the AND gates of the first group AG$_1$ is opened whereby a specific one of the phase search pulses or outputs at 0–7 of the decoder 190b is passed through an output OR gate OR$_1$ to a monitoring charge signal generator 200 which will be described hereinafter. Which one of the AND gates of the first group AG$_1$ is to be opened depends on the output of a second decoder 190c which is supplied with count codes of a second counter 190d. Clearing and upcounting of the second counter 190d are controlled by a central controller or central control device or unit 240. For a phase searching operation, the central control device 240 first clears the counter 190d so that the signal level at the output terminal 0 of the decoder 190c becomes high or "1". This opens the AND gate 0 of the first group AG$_1$ to deliver a phase search pulse appearing at the output terminal 0 of the decoder 190b to the monitor charge signal generator 200. For the duration of this phase search pulse, the charge signal generator 200 applies a charging voltage to a monitor charging electrode 20a$_m$. Observing the output of a charge detection circuit 210 which is connected to a monitor charge detecting electrode 40a$_m$, the central control device 240 supplies the counter 190d with one pulse if the output level of the charge detector 210 has not become "1" indicative of "charged" in a predetermined period of time after the clearing of the counter 190d. Then the signal level at the next output terminal 1 of the decoder 190c becomes "1" whereby the AND gate 0 of the first group AG$_1$ is closed and the AND gate 1 is opened to pass the second set of phase search pulses or output pulses at the terminal 1 of the decoder 190b to the charge signal generator 200 through the OR gate OR$_1$. It will be seen here that the pulses thus coupled to the charge signal generator 200 have a phase delay of T$_1$ relative to the preceding set of phase search pulses. Again, the central control device 240 observes the output level of the charge detector 210 and keeps on feeding pulses to the counter 190d until the output level becomes "1", causing the counter 190d to count up. When a "1" output indicative of "charged" is supplied from the charge detector 210 of the central controller 240, the latter supplies no more pulses to the counter 190d since an optimum charging phase has been determined. Then the central controller 240 supplies all of the AND gates 0–7 of the second group AG$_2$ with ON or "1" signals therefrom. Supposing that the count at the counter 190d existing at that instant is "3", the signal level at the output terminal 2 of the decoder 190c is "1" opening the AND gate 2 of the first group AG$_1$ and the AND gate 2 of the second group AG$_2$. A third set of phase search pulses are therefore supplied from the AND gate 2 of the group OG$_1$ to the OR gate OR$_1$ while an output of the OR gate 2 of the group OG$_1$ which is the combination of phase search pulses of the second and fourth sets is coupled to the OR gate OR$_1$. Stated another way, if it is the third set of phase search pulses that corresponds to the optimum charging phase, the OR gate OR$_1$ supplies the charge signal generator 200 with a print charge pulse which is the sum (logical sum) of a pulse of the third set and those of the second and fourth sets on opposite sides of the third set, or a pulse having the search setting pulse at its center and lasting a duration of 3T$_1$ which is three times as long as the duration of said pulse. Making the duration of phase search pulses short and that of print charge pulses long functions to detect a charging phase accurately through phase search and ensure positive charging for printing. It will be noted in FIG. 1b that the mechanical arrangement is shown with the monitoring ink ejection hole 14a$_m$ at the center and with the monitoring charging electrode 20a$_m$ and onward in sectional plan view.

As already described, the monitor charge electrode 20a$_m$ is supplied with a charging voltage from the charging signal generator 200 as long as an output print charge pulse ("1" level) of the phase setting circuit 190 lasts. The charge signal generator 200 comprises a standard code setter 200a loaded with a standard charging voltage code of the maximum deflection level (lowest value of the charging voltage of the maximum deflection level), an up-down counter 200b, eleven AND gates 0–10 constituting a third AND gate group AG$_3$, a digital-to-analog converter 200c and a voltage amplifier 200d. Up- and down-counting actions of the counter 200b are controlled by the central control device 240. All of the AND gates of the third group AG$_3$ remain opened while a print charge pulse appears. The standard charge voltage is determined such that, when it is coupled to the monitor electrode 20a$_m$, ink droplets charged thereby necessarily impinge on the electrode 80a regardless of the conditions. Connected with the electrode 80a is a deflection detection circuit 220 whose major component is an integration circuit. The deflection detector 220 is made up of an integrating MOS FET (metal oxide silicone field effect transistor), a capacitor C, an operational amplifier OPA$_4$, a comparator COM$_1$, a reed relay LR and a relay driver (amplifier) LD. When the relay driver LD of the deflection detector 220 is energized for a moment, the relay LR is temporarily closed causing the capacitor C to discharge or release its charge (resetting). Thereafter, when charged ink droplets come to impinge on the electrode 80a, the capacitor C is charged little by little upon impingement of each ink droplet and this charge voltage is converted into a voltage by the FET and coupled to an operational amplifier OPA$_4$. The amplifier OPA$_4$ then amplifies the input voltage and applies its output to the comparator COM$_1$. A reference voltage Vref which is also coupled to the comparator COM$_1$ is in this embodiment set at a value lower than an output voltage of the operational amplifier OPA$_4$ which will appear after 256 droplets of ink carrying a standard charge impinge on the electrode 80a. With this, it will be seen that, by observing the output level of the circuit 220 after the production of 256 ink droplets which follows the momentary closing of the relay LR, the ink droplets can be determined as impinging on the electrode 80a if the output level mentioned is "1" indicative of "charged" and non-impinging if it is "0". Accordingly, a deflection position of ink droplets can be identified by the steps of once closing the relay LR of the deflection detector 220, counting the clock pulses CK$_1$ and checking the output level of the deflection detector 220 after the count of the clock pulses has reached 256×8 for example, that is, after 256 ink droplets have been formed. A "1" output of the deflection detector 220 indicates insufficient deflection. The central control device 240, if the output level of the circuit 220 is "1", conditions the up-down counter 200b of the charge signal generator 200 for an up-counting mode and supplies one pulse thereto while momentarily closing or resetting the relay LR of the deflection detector 220. Also, counting the clock pulses CK$_1$, the central control device 240 again checks the output level of the deflection detector 220 when the count reaches a predetermined value and causes the counter 200b to keep on upcounting for thereby adjusting the charge voltage. A count code of the counter 200b which will appear when the output level of the circuit 220 turns to "0" shows a charge voltage necessary for directing ink droplets to a predetermined maximum deflected position, i.e. a charge voltage of the 40th step. As will be described, the central controller 240 based on the charge voltage code determines the 1st to 40th steps of charge voltages and delivers them sequentially from the first step to the 40th step at the period of $T_0=8T_1$ in timed relation with the production of ink droplets. Upon delivery of the 40th charge voltage code, the central controller 240 repeats the delivery of the same series of charge voltage codes starting from the 1st step. The charge voltage codes are processed by a digital-to-analog converter 250 into analog signals and passed to individual print charge signal generators $200a_i$ connected with the individual charging electrodes $20a_i$ which are associated with the printing ink ejection holes $14a_i$ of the nozzle plate 14 within the recording width of the latter.

To summarize the deflection search operation, the ink jet from the hole $14a_m$ is sweepingly deflected upwardly along the X—X axis by progressively increasing the charge applied thereto. The output of the detector 210 goes from "1" to "0" when the ink jet just passes the upper edge of the electrode 80a which extends in the Y—Y axis direction and intersects the X—X axis of deflection of the ink jet. The count in the counter 200b at this time corresponds to the charge voltage applied to the ink jet and thereby to the amount of deflection force applied thereto. It is thus determined the amount of charge voltage or deflection force required to deflect the ink jet by a predetermined amount. This value also determines the amplification factor of the staircase voltage pulse waveform to be applied to the ink jets for printing.

Figure 1D:
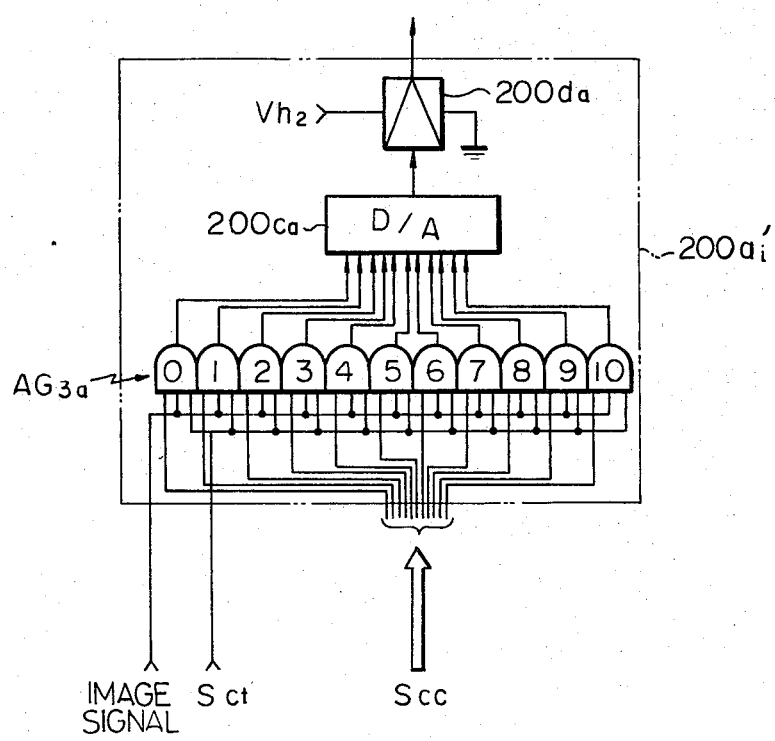
FIG. 1d is a block diagram showing a modification of a printing charge signal generator.

Each of print charge signal generators $200a_i$ has a construction depicted in FIG. 1c. The number of the generators $200a_i$ installed in the apparatus is the same as that of the charging electrodes $20a_i$ for printing. The generators $200a_i$ are commonly supplied with output analog signals from the digital-to-analog converter 250. In the charge signal generator shown in FIG. 1c, an output of the digital-to-analog converter 250 is coupled to a MOS FET designated as $FET_2$ in the drawing. This $FET_2$ receives an output of an AND gate $AN_1$ at its gate and supplies its output to a voltage amplifier $200d_a$ whose output is in turn coupled to a charging electrode $20a_i$. Applied to two input terminals of the AND gate $AN_1$ are a print charge pulse $S_{ct}$ which is an output of the phase setter 190 and an image signal (having a "1" level indicative of recording and a "0" level indicative of non-recording). Only when the image signal level is "1", a print charge pulse $S_{ct}$ is supplied to the voltage amplifier $200d_a$ which then applies a charging voltage to the electrode $20a_i$. It will be noted that, where the central controller 240 is to supply the charge voltage generators $200a_i$ for printing with charge voltage codes $S_{cc}$, each of charge voltage generators $200a_i'$ may be furnished with AND gates of a third AND gate group $AG_{3a}$ and a digital-to-analog converter $200c_a$ in the same way as the monitor charge voltage generator 200 as indicated in FIG. 1d of the drawings.

Concerning the central control device 240, it comprises a central processing unit or CPU which may be constituted by a microprocessor, a semiconductive read-only memory or ROM, a semiconductive random access memory or RAM and a microcomputer of one or several chips having input/output ports (not shown). The read-only memory stores therein program data for practicing the aforementioned various control, constant data which will be referred to for such programs, and other additional program and constant data. The central controller 240 controls printing operation in cooperation with an image signal processing control unit (not shown) on the image signal delivery side of the apparatus. Reference will now be made to the flowcharts shown in FIGS. 2a–2d for describing a part of the operation of the central controller 240 which is directly concerned with practicing the present invention. As a part of the constant data, the read-only memory of the central controller 240 stores the 1st to 40th steps of standard charge voltages $V_{c1}$–$V_{c40}$ under standard conditions wherein ink droplets would impinge on the electrode 80a when ejected at a pressure indicated by the standard code and charged with a voltage of the 40th step indicated by a reference code. For the convenience of description, regions of the read-only memory which store such data will be referred to as standard charge voltage storages or simply storages 1–40 as shown in Table 1.

TABLE 1

| STORED REGION | STORED DATA IN ROM STORED CONTENT |
|---|---|
| STORAGE 1 | standard charge voltage $V_{c1}$ for deflection to 1st position |
| STORAGE 2 | standard charge voltage $V_{c2}$ for deflection to 2nd position |
| STORAGE 3 | standard charge voltage $V_{c3}$ for deflection to 3rd position |
| ⋮ | ⋮ |
| STORAGE 40 | standard charge voltage $V_{c40}$ (set code of 200a) for deflection to 40th position |

Meanwhile, the random access memory of the central controller 240 has predetermined regions for temporary storage. These specific regions will be referred to as registers for convenience and, in relation with the flowchart, they store contents shown in Table 2.

TABLE 2

| MEMORY REGION | READ/WRITE MEMORY DATA IN RAM CONTENT |
|---|---|
| TIMER 1 REGISTER | count of $CK_1$ for counting time |
| TIMER 2 REGISTER | count of $CK_1$ for counting time |
| COUNTER 1 REGISTER | count of $CK_1$ for counting time |
| COUNTER 2 REGISTER | number of formed ink droplets (for deflection detection) |
| CHARGE VOLT REGISTER 1 | charge voltage $V_{a1}$ actually applied to $20a_i$ for 1st deflection position |
| CHARGE VOLT REGISTER 2 | charge voltage $V_{a2}$ actually applied to $20a_i$ for 2nd deflection position |
| CHARGE VOLT REGISTER 3 | charge voltage $V_{a3}$ actually applied to $20a_i$ for 3rd deflection position ($S_{cc}$) |

TABLE 2-continued

| MEMORY REGION | READ/WRITE MEMORY DATA IN RAM CONTENT |
|---|---|
| CHARGE VOLT REGISTER 40 | charge voltage $V_{a40}$ actually applied to $20a_i$ for 40th deflection position |
| COEFFICIENT REGISTER | voltage $V_{m40}/V_{c40}$ indicated by count code of counter 200b |
| COUNTER 4 REGISTER | number of $CK_1$ (for frequency division) |
| COUNTER 5 REGISTER | number of formed ink droplets (for switching charge voltage) |

Figure 2A:
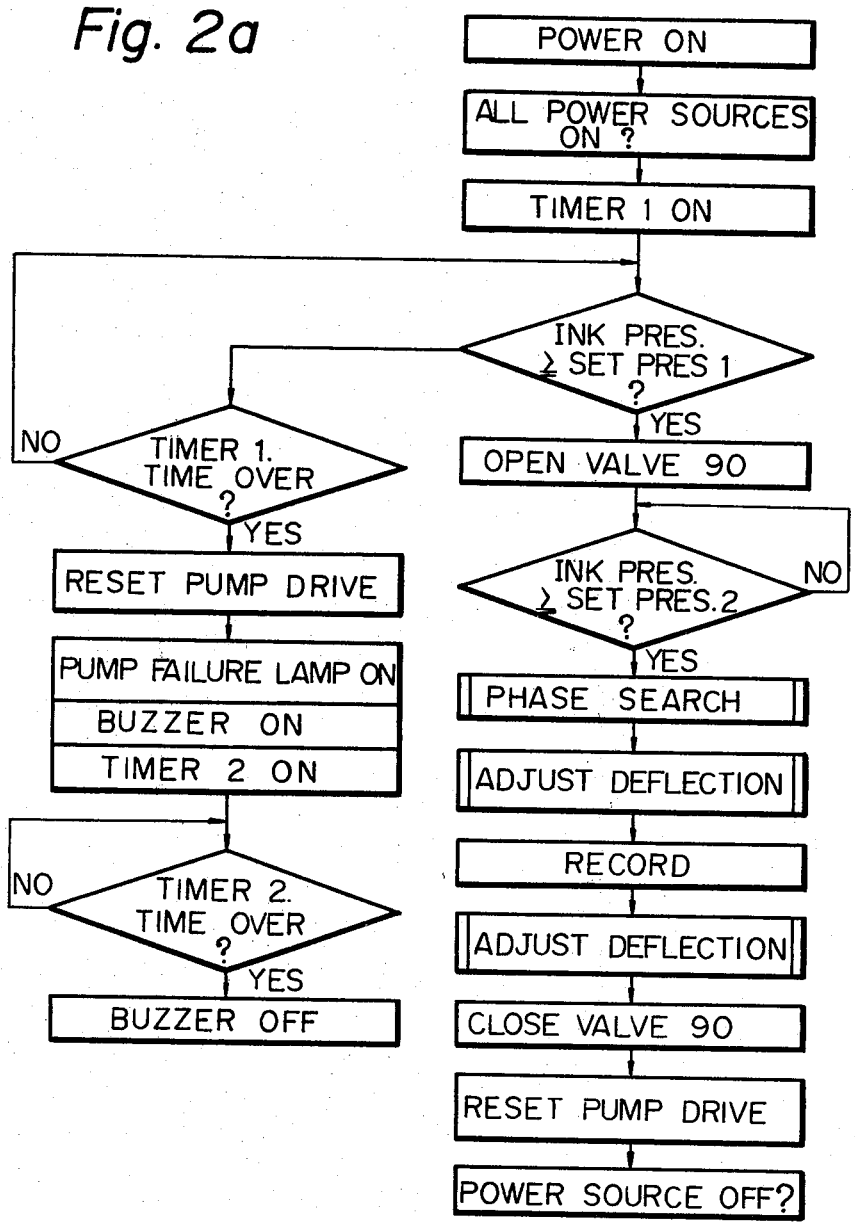
FIG. 2a is a flowchart outlining a control operation of a central control device from a step of power source application to the end of recording.

Referring first to FIG. 2a, the operation of the central controller 240 will be outlined. When power is supplied to the central controller 240 from its associated power source, it turns on power sources for various units and circuits which it is to control (FIGS. 1a, 1b and 1c) according to a predetermined sequence and starts counting the clock pulses $CK_1$. This action is performed on the basis of a count program according to which "1" is added to the content of the timer 1 register every time a clock pulse $CK_1$ arrives and the sum is stored anew in the timer 1 register. As the timer 1 register reaches a predetermined value meaning "time over", the central controller 240 checks the ink pressure and, if the ink pressure is higher than a first reference pressure 1, it energizes the electromagnetic valve 90 for thereby establishing communication between the accumulator 100 and ink jet head 10. If the ink pressure remains lower than the reference level 1, after the timer 1 register has reached the reference value or under a "time over" condition, the central controller 240 turns off the power sources for pump drive and control circuits and for printing actions while latching a failure indication lamp and a buzzer in their energized states. At the same time, the central controller 240 starts adding "1" to the timer 2 register in synchronism with the clock pulses $CK_1$ and storing the sums anew in succession (timer 2 ON). As the timer 2 register exceeds a predetermined count meaning "time over", the buzzer is deenergized but the lamp is kept turned on. As already stated, then the ink pressure rises beyond the reference value 1 and the valve 90 is opened, ink will be ejected from the head 10 resulting in a temporary drop of the ink pressure. To cope with this, the central controller 240 waits until the ink pressure exceeds a second reference level 2 and then performs phase search which is followed by adjustment of the amount of deflection. After the adjustment of the deflection amount, the central controller 240 informs the image signal delivery side of the end of preparation for recording operation and demands the supply of image signals. The central controller 240 in this way performs its actions for reproducing images on the recording sheet. During printing operation, the central controller 240 carries out phase search and adjustment of deflection amount in response to phase search commands and deflection adjustment commands which will be applied thereto from the image signal delivery side. Upon completion of the printing operation, the central controller 240 in response to an end command from the image signal delivery side first deenergizes the valve 90 and then turns off the power source associated with the pump drive and control circuit and then turns off the power sources for the other units and circuits (FIGS. 1a, 1b and 1c). The power source associated with the controller 240 proper is turned on and off by the image signal delivery side.

Figure 2B:
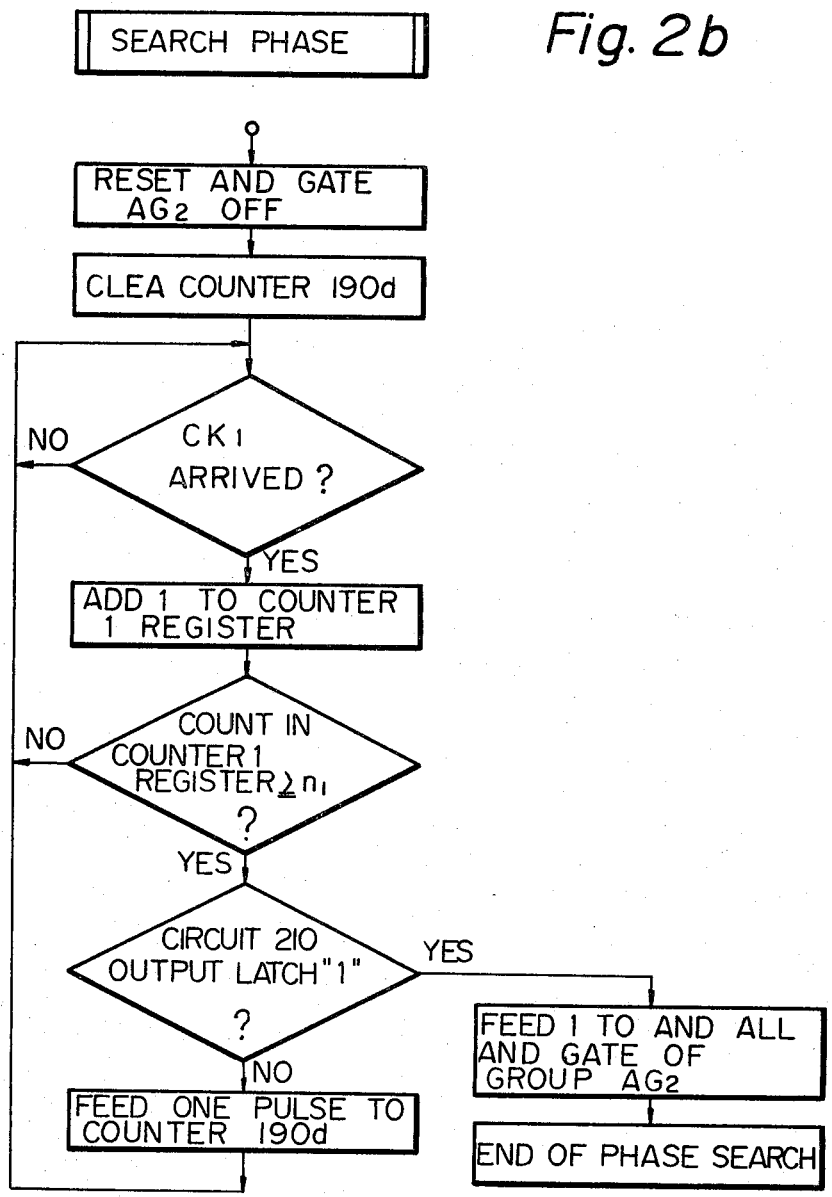
FIG. 2b is a flowchart demonstrating in detail the steps of phase searching and setting.
Figure 2C:
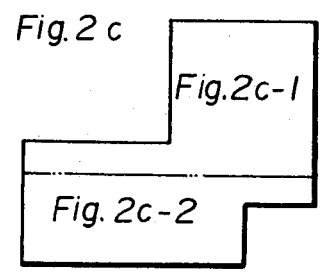
Figure 1:
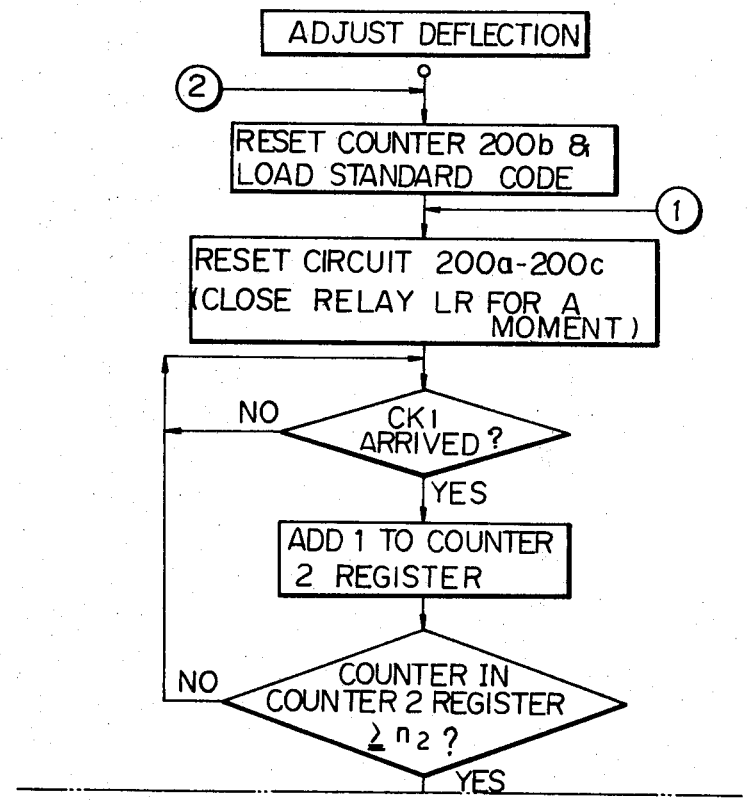
Figures 2, 2C:
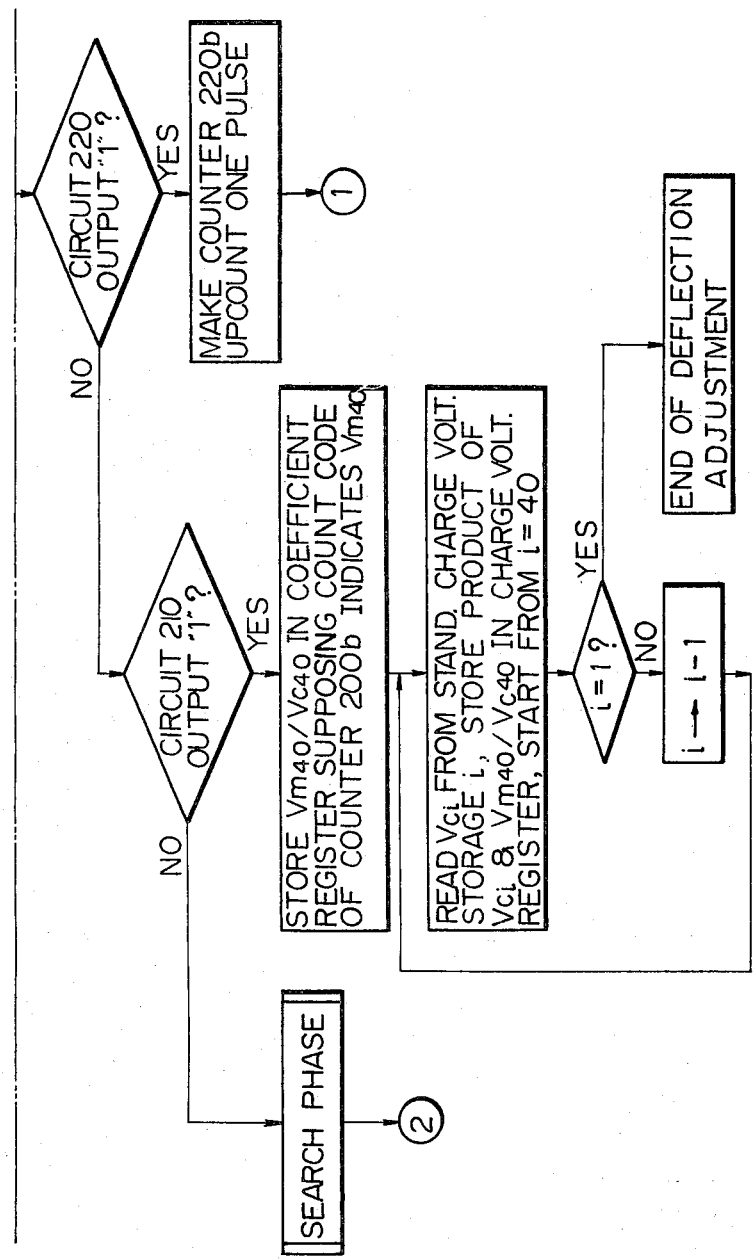
Figure 2D:
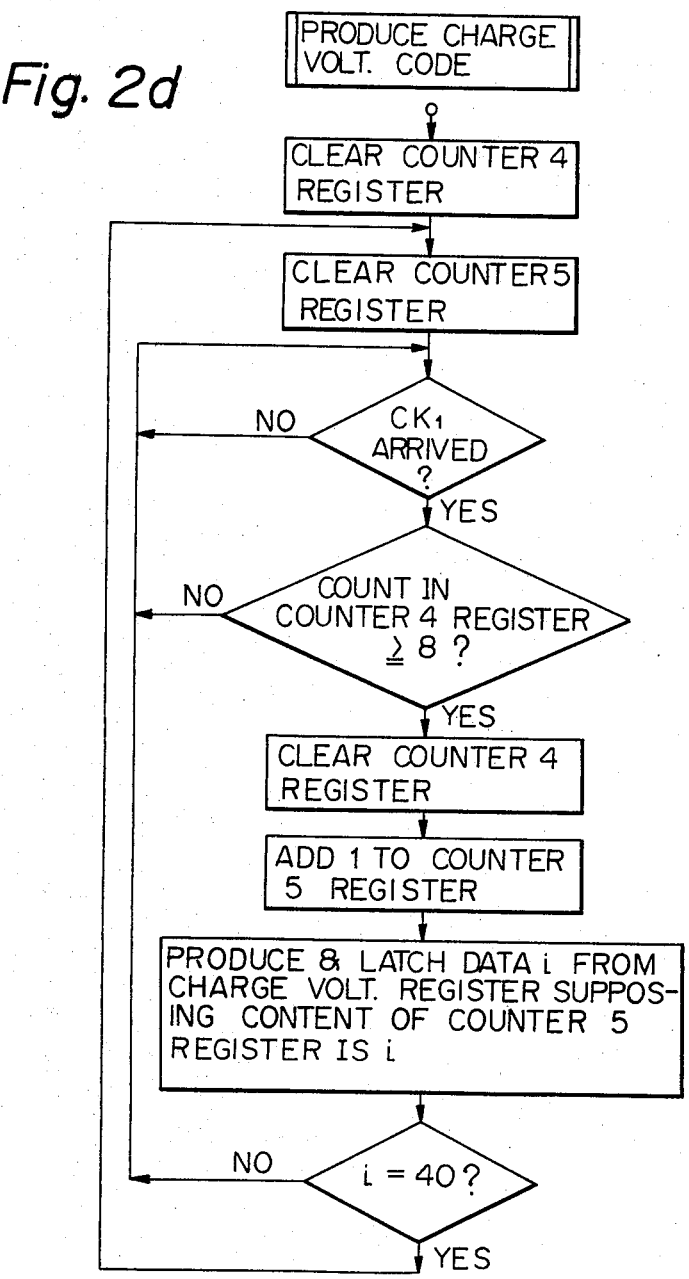
FIG. 2d is a flowchart indicative of a charge voltage code producing procedure for printing.

Referring to FIGS. 2b–2d, there will be described in detail those operations of the central controller 240 for searching a phase, adjusting the amount of deflection and setting a charge voltage during printing action.

Concerning the phase searching procedure, the central controller 240 first closes all of the AND gates 0–7 of the second group $AG_2$ in the phase setter 190 (output latch reset of the controller 240) and clears the counter 190d as shown in FIG. 2b. In this situation only the AND gate 0 of the first group $AG_1$ remains opened so that only the first set of phase search pulses (appearing at the output terminal 0 of the decoder 190b) are coupled to the monitor charge signal generator 200. The controller 240, counting the clock pulses $CK_1$ (the counter 1 register storing the number of received clock pulses $CK_1$), checks whether the charge detector 210 has latched a "1" output when the count of the clock pulses increases beyond a predetermined number $n_1$, that is, after the formation of a predetermined number of ink droplets. If not "1", the controller 240 supplies one pulse to the counter 190d. At this instant, the decoder 190c switches the "1" level output from the output terminal 0 to the output terminal 1 whereby the AND gate 1 of the first group $AG_1$ is allowed to pass the second set of phase search pulses (output terminal 1 of the decoder 190b) therethrough to the monitor charge signal generator 200. Upon lapse of a predetermined period of time, the controller 240 refers to the output level of the charge detector 210 and, if it is "0", again supplies one pulse to the counter 190d. In this way, the phase search pulses applied to the monitor charge signal generator 200 are shifted by $T_i$ each within the droplet forming period $T_8 = 8T_1$ where $T_1$ is the period of the clock pulses $CK_1$. An output code of the counter 190d which appears when the output of the charge detector 210 becomes "1" meaning the "charged" state of the ink droplets indicates the phase search pulses which properly charge the ink droplets. After this phase search, the controller 240 opens all of the AND gates 0–7 of the second group $AG_2$ and latches them in this state. Then the OR gate $OR_1$ is allowed to produce print charge pulses each having a proper phase search pulse at the center and lasting a duration of $3T_1$ which is three times as long as that $T_1$ of the proper phase search pulse.

For the adjustment of the deflection amount, the central controller 240 operates as will be described with reference to FIG. 2c. The controller 240 first resets the counter 200b and loads it with a standard code so that the 40th step of standard charge voltage is applied to the charging electrode $20a_m$. The controller 240 then closes the reed relay LR of the deflection detector 220 for a moment to discharge the capacitor C and starts counting the ink droplets formed. As this count increases beyond a predetermined value, the controller 240 checks the output level of the deflection detector 220. If the output level of this circuit is "1" (the voltage $V_{c40}$ is so determined that this output level necessarily becomes "1" for the first time), the controller 240 conditions the counter 200b for an upcount mode and supplies it with one pulse while temporarily closing the relay LR of the circuit 220 and counting the ink droplets formed again. As the number of formed droplets reaches a predetermined value, the controller 240 re-checks the output level of the deflection detector 220. This procedure of the controller 240 for causing the counter 200b to upcount, resetting the deflection detector 220 and counting ink droplets formed is repeated until the output level of the deflection detector 220 becomes "0". Once the deflection detector 220 provides a "0" output indicating an optimum amount of deflection, the controller 240 divides the charge voltage $V_{m40}$ indicated by the count code of the counter 200b by the standard charge voltage $V_{c40}$ stored in the standard charge voltage storage 40 of the read-only memory (see Table 1) and, thereupon, stores the compensation coefficient or amplification factor for the printing deflection $V_{m40}/V_{c40}$ in its coefficient register. The controller 240 also stores in the charge voltage register 40 (Table 2) the product $V_{a40}$ of the data stored in the standard charge voltage storage 40 of the read-only memory and the coefficient $V_{m40}/V_{c40}$. Then the controller 240 stores in the charge voltage register 39 the product of the data $V_{c39}$ in the standard charge voltage storage 39 of the read-only memory and the coefficient $V_{m40}/V_{c40}$. After a series of like actions, the controller 240 finally stores in the charge voltage register 1 the product $V_{a1}$ of the data $V_{c1}$ in the standard charge voltage storage 1 of the read-only memory and the coefficient $V_{m40}/V_{c40}$ thus completing the procedure for deflection adjustment.

In the course of printing operation, the controller 240 sequentially produces and latches the data stored in the individual charge voltage storages 1-40 in synchronism with the formation of ink droplets. After reading out the data from the storage 40, the controller 240 again reads out the data from the storage 1 and circulates through the storages as 2, 3, 4, . . .

Figure 3:
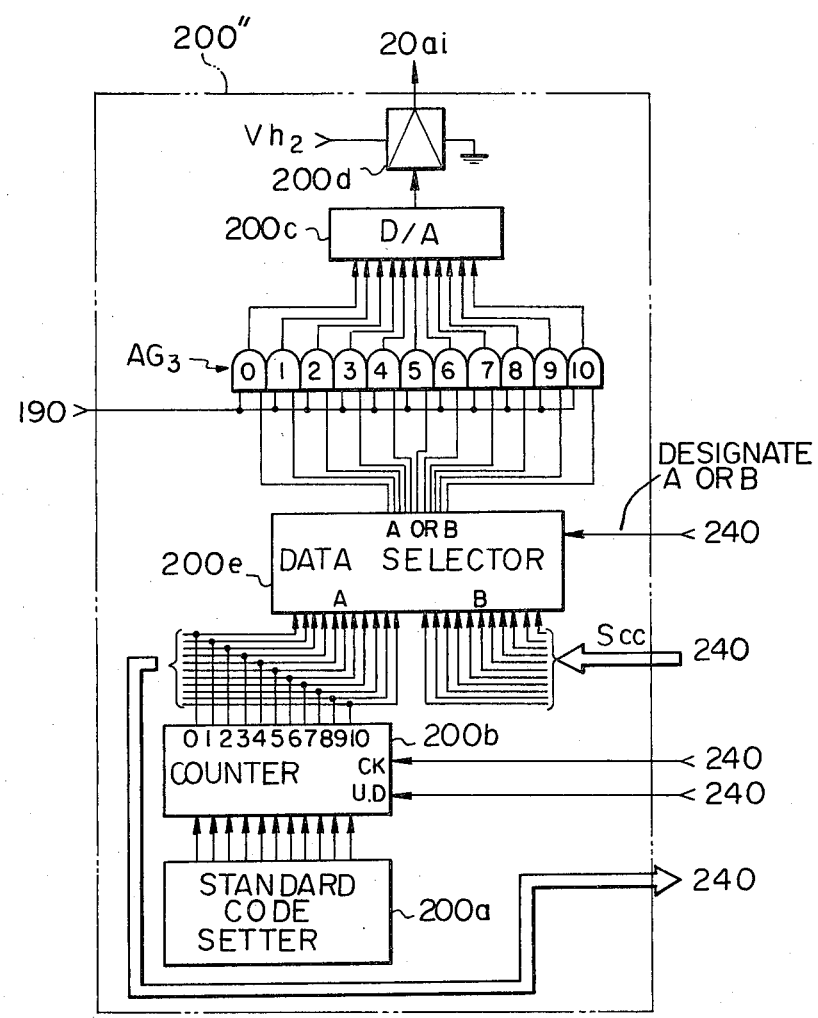
FIG. 3 is a block diagram showing a modified form of a charge voltage generator.

An alternative form and some modifications of the present invention will hereinafter be described. As discussed hereinabove, the preferred form shown in FIG. 1a uses a multinozzle ink jet head provided with forty-two ink ejection ports arranged at 5 mm intervals throughout the recording width of the head such that each of the ejection ports covers 5 mm of recording width with 40 dots of ink (8 dots/mm). The apparatus of FIG. 1a may be provided with an additional ink ejection port which for monitoring purpose ejects ink under the same conditions as the forty-two recording ejection ports. As ink jet recording apparatus may alternatively have a single nozzle head, or one deflection detecting electrode 80a for each of the recording ejection ports, or one or plural ink ejection ports for common use in ejecting recording ink and monitoring ink. In any of these cases, a single charge signal generator is usable for both monitoring and charging for recording. An example of such an arrangement is illustrated in FIG. 3. A charge signal generator 200'' shown in FIG. 3 additionally includes a data selector 200e intervening between the counter 200b and the third group of AND gates AG₃. The data selector 200e receives at a terminal A the output count codes of the counter 200b and at an other input terminal B the output codes $S_{cc}$ of the central controller 240 indicative of the set charge voltages $V_{a1}$-$V_{a40}$. With this alternative design, the central controller 240 will supply the data selector 200e with a signal for designating the input terminal A during phase search and deflection adjustment and with a signal designating the other input terminal B during actual printing action. Thus, the data selector 200e serves as a data selecting or switching means.

As will also be noted, the charge detecting electrodes $40a_i$, $40a_m$ and charge detector 210 installed in the embodiment shown in FIGS. 1a-1c may be omitted. Without these components, the controller 240 in the phase search (FIG. 2b) will close the relay RL of the deflection detector 220 a moment after clearing the counter 190d and then start counting the droplets of ink formed. As this count reaches a predetermined value, the controller 240 will check the output level of the deflection detector 220 and, if said output level is "1", complete the phase search but, if not, it will reset the deflection detector 220 and feed one pulse to the counter 190d. Such a procedure will be repeated until the output level of the deflection detector becomes "1".

As regards the voltages $V_{a1}$-$V_{a40}$ to be actually applied to the charging electrodes $20a_i$, the above-described embodiments commonly employ a read-only memory fixedly storing standard charge voltages $V_{c1}$-$V_{c40}$ necessary for deflecting individual ink droplets to the predetermined 1st to 40th positions along the X—X direction (FIG. 1a) under a standard ink pressure. The voltages $V_{a1}$-$V_{a40}$ are determined by multiplying the standard charge voltages $V_{c1}$-$V_{c40}$ by a coefficient which is the ratio of the charge voltage $V_{m40}$ actually needed to print an ink droplet of the 40th step of charge in the predetermined 40th position to the voltage $V_{c40}$ indicated by the set code of the standard code setter 200a, i.e. $V_{m40}/V_{c40}$. It will be noted, however, that other suitable methods are possible for setting the voltages $V_{a1}$-$V_{a40}$. Here, it is not always necessary to calculate the voltage $V_{a40}$ since the voltage $V_{a40}$ is equal to the charge voltage $V_{m40}$.

Now, some examples of such an alternative method of determining charge voltages will be discussed. In one alternative method, data stored in the standard charge voltage storages 1-40 of the read-only memory ROM are in the form of the ratios to the standard charge voltage ($V_{c40}$) of the "j" step to be actually set by the detection of deflection (j=40 in the embodiments described) of the standard charge voltages ($V_{c1}$-$V_{c40}$) of the step, i.e. $K_1=V_{c1}/V_{c40}$, $K_2=V_{c2}/V_{c40}$, . . . $K_{40}=V_{c40}/V_{c40}$). The charge voltages $V_{a1}$-$V_{a40}$ to be actually applied at the respective steps are obtained as $V_{a1}=K_1 \cdot V_{m40}$, $V_{a2}=K_2 \cdot V_{m40}$, . . . $V_{a40}=K_{40} \cdot V_{m40}$. In another possible method, a read-only memory fixedly stores therein "n ($\geq 2$)" sets of reference data which are ($V_{1c1}$-$V_{1c40}$), ($V_{2c1}$-$V_{2c40}$), ($V_{3c1}$-$V_{3c40}$) . . . ($V_{nc1}$-$V_{nc40}$) where $V_{ic40}=V_{2c40}=V_{3c40}\ldots=V_{nc40}$. If data equal to the measured voltage $V_{m40}$ which are ($V_{hc1}$-$V_{hc40}$) and $V_{hc40}=V_{m40}$ are present, the data ($V_{hc1}$-$V_{hc40}$) will be picked up as actual charge voltages. But, if not, data ($V_{kc1}$-$V_{kc40}$) and ($V_{lc1}$-$V_{lc40}$) involving $V_{xc40}$ nearest $V_{m40}$ will be picked up where $V_{kc40}<V_{m40}<V_{c40}$, and the charge voltages $V_{a1}$-$V_{a40}$ to be actually applied are determined on the basis of proportional allotment, that is, the voltage $V_{a1}$ from $V_{kc1}$ and $V_{lc1}$, the voltage $V_{a2}$ from $V_{kc2}$ and $V_{lc2}$, up to the voltage $V_{a40}$ from $V_{kc40}$ and $V_{lc40}$. It will be noted in the foregoing description that the individual sets of data $V_{c1}-V_{c40}$, $(V_{1c1}-V_{1c40}) \ldots (V_{nc1}-V_{nc40})$ are actual charge voltages obtained by continuously printing 40 dots under various conditions.

Although the charge voltage level has been described as being progressively raised while charged droplets of ink are impinging on the electrode 80a, it will be understood that the standard charge code ($V_{c40}$) may have a large value which causes ink droplets charged thereat to always miss the electrode 80a under any conditions, so that the charge voltage is lowered progressively while the charge detector 220 is maintaining its "0" output and an amount of deflection that appears upon change of the output from "0" to "1" is determined proper. In this case, if the charge detecting electrodes 40$a_i$ and 40$a_m$ are omitted, the counter 200b will operate in a downcounting mode and phase search will be started after setting up a predetermined charge voltage ($V_{c40}30 V_{ss}$) at which charged ink droplets will necessarily impinge on the electrode 80a.

Furthermore, the electrode 80a may be located on the high deflection side of the arrangement instead of placing it on the smaller deflection side as in the embodiments. Again, this alternative design may be employed in combination with any one of the two aforementioned different systems: one in which the standard charge code $V_{c40}$ has a high level which causes ink droplets charged thereat to always impinge on the electrode 80a and the counter 200b keeps on downcounting while the ink droplets are impinging on the electrode 80a, and the other in which the standard charge code $V_{c40}$ has a value which allows ink droplets charged thereat to always miss the electrode 80a and the counter 200b keeps on upcounting until ink droplets come to impinge on the electrode 80a. Where it is desired to omit the charging electrodes 40$a_i$ and 40$a_m$ when employing the second-mentioned system, phase search will begin after a predetermined charge voltage has been set up at which charged ink droplets necessarily impinge on the electrode 80a.

While the amount of deflection has been adjusted by adjusting the charge voltage in any of the described embodiments and possible modifications, the amount of deflection is adjustable by adjusting the ink pressure or deflection voltage alternatively.

Figure 4A:
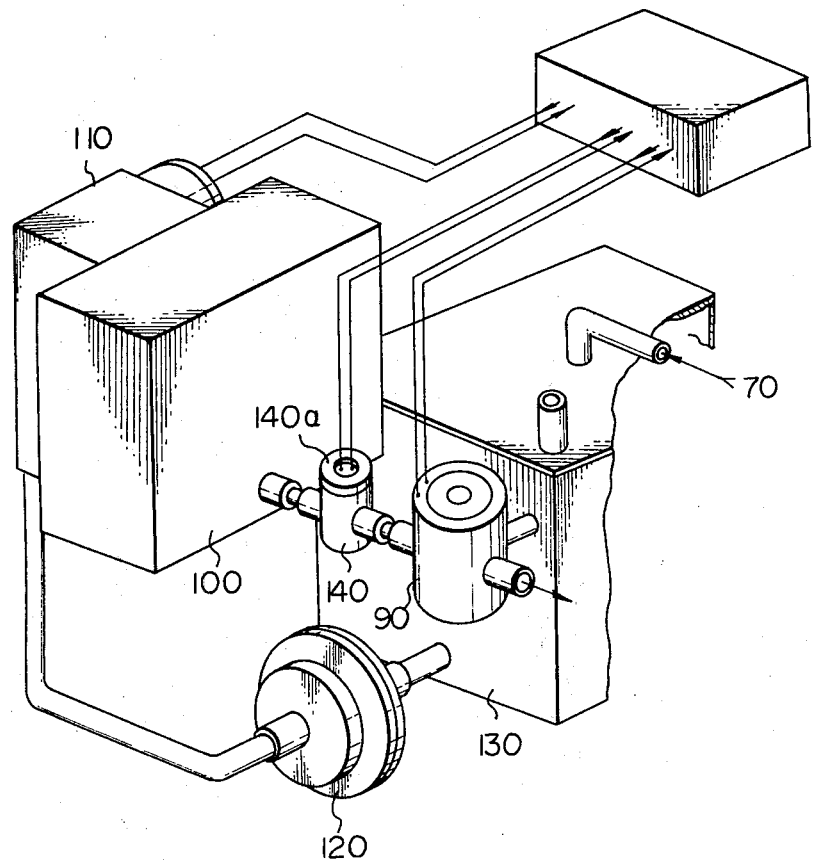
FIG. 4a shows in perspective form a part of a mechanical arrangement according to another embodiment of the present invention.

Another possible form of the present invention which relies on the adjustment of the ink pressure maintains the ink pressure stable through detection thereof. Such a construction may have a mechanical arrangement shown in FIG. 4a and a control circuit shown in FIG. 4b. In this embodiment shown in FIGS. 4a and 4b, a liquid chamber member 140 having a semiconductive strain gauge 140a sealed therein is disposed between the electromagnetic valve 90 and accumulator 140.

A fluid control section comprises a valve driver (amplifier) 150, a pressure setting circuit 160 and a pump drive and control circuit 170. When the central controller 240 supplies the valve driver 150 with a valve open command (for communicating input and output ports of the valve and energizing the coil) as its "1" level output, the coil of the valve 90 is supplied with a predetermined level of current to open the valve. The pressure setting circuit 160 is made up of a standard code setter 160a, an up-down counter 160b and a digital-to-analog converter 160c. The standard code setter 160a which is of the fixed or semi-fixed type is loaded with a code corresponding to the standard ink pressure.

When one count pulse arrives at the up-down counter 160b which has been supplied with an upcount command "1" or a downcount command "0", the counter 160b produces a code indicative of a number given by adding "1 (one)" to the output code of the standard code setter 160a. The counter 160b holds said code unless a count pulse arrives thereat. The output code of the counter 160b is processed by the digital-to-analog converter 160c into an analog signal and passed therefrom to the pump drive and control circuit 170.

Besides this analog signal from the converter 160c indicating a set pressure, the pump drive and control circuit 170 is supplied with an analog signal from the semiconductive strain gauge 140a. This analog output of the strain gauge 140a is high or low in level when the pressure of ink is high or low respectively. In the circuit 170, the voltage at the strain gauge 40a is inverted and amplified by an operational amplifier $OPA_1$ while the analog signal from the digital-to-analog converter 160c is inverted and amplified by another operational amplifier $OPA_2$. Output of these operational amplifiers $OPA_1$ and $OPA_2$ are commonly coupled to a differential amplifier DAM. Supposing that the operational amplifier $OPA_1$ is producing an output voltage $v_1$ (inversely proportional to the ink pressure) which is $v_1 \geq 0$ and the operational amplifier $OPA_2$ an output voltage $v_2$ (inversely proportional to the set pressure) which is $v_2 \geq 0$, the differential amplifier DAM produces an output voltage $V_3$ which is $v_3 = K(v_1-v_2)$. Therefore, the output voltage $v_3$ of the differential amplifier DAM will become lower as the actual ink pressure rises and as the designated pressure level drops while becoming higher as the actual ink pressure drops and as the designated pressure level rises. Only at a certain predetermined level of the voltage $v_3$, a switch SW in the form of a relay or a switching semiconductive element for instance is closed to supply the inverting input terminal of a third operational amplifier $OPA_3$ with a 50 Hz sinusoidal wave which constitutes a pump drive signal. Suppose here that the voltage $v_2$ appearing from the operational amplifier $OPA_2$ is constant. Then the output voltage $v_3$ of the differential amplifier DAM is proportional to the output voltage $v_1$ of the operational amplifier $OPA_1$ and therefore inversely proportional to the ink pressure. The switch SW closes when the ink pressure is lower than a predetermined level and opens when it rises beyond the predetermined level, the pump 110 being driven only when the switch SW is open. In this way, the ink pressure is controlled to a predetermined constant level. The pressure designating signal $v_2$ is applied to the differential amplifier DAM as a reference signal for the above-mentioned constant voltage control and which shifts in inversely proportional relation with the designated pressure level. Accordingly, the ink pressure will be controlled to a first constant pressure $P_0$ in response to a given designated pressure level $V_0$, to a second constant pressure $P_h (>P_0)$ in response to a designated pressure level $V_h$ higher than the level $V_0$, and to a third constant pressure $P_l (<P_0)$ in response to a designated pressure level $V_l$ lower than the level $V_0$. While the switch SW is in its closed state, transistors $Tr_1$ and $Tr_2$ are alternately turned on in synchronism with the positive and negative half-waves of the 50 Hz sinusoidal wave whereby the coil of the pump 110 is alternately and repeatedly energized in opposite directions. That is, it is only when the switch SW is closed that the pump 100 is activated. As an alternative technique for the ink pressure control, the pump 110 may have its energizing frequency, pulse duration and/or current level controlled in accordance with the output level of the differential amplifier DAM.

Where the electrode 80a is located on the low deflection side as in FIG. 1b, the pressure setting standard code in the embodiment of FIG. 4 is set at a high ink pressure which causes all charged ink droplets to impinge on the electrode 80a. While the charge detector (220) is holding the "1" output level, the central controller 240 causes the counter 160b to operate in a downcount mode and supplies pulses thereto. However, due to the slow response of the ink pressure, the circuit 220 must be reset to start counting of the droplets of ink formed only after the ink pressure detected by the strain gauge 140a has settled at a low level after the downcounting operation. This adds to the adjustment time necessary for this embodiment.

Figure 5:
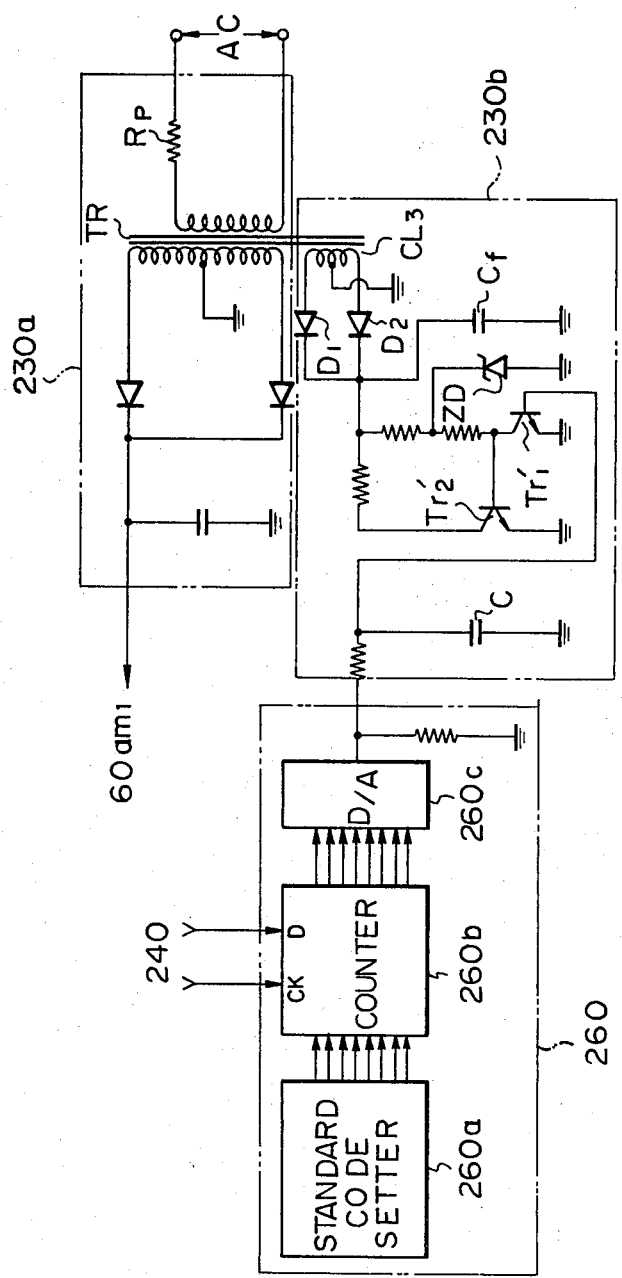
FIG. 5 is a circuit diagram of a power source according to a further embodiment of the present invention and adapted to provide deflection voltages.

Turning to FIG. 5, there is shown a deflection voltage power source device applicable to one embodiment of the present invention which adjusts the amount of deflection by adjusting the deflection voltage. The power source device shown in FIG. 5 comprises a power supply circuit 230a, a voltage control circuit 230b and a voltage setting circuit 260. The voltage control circuit 230b is made up of a coil $CL_3$ wound round the iron core of a transformer TR included in the booster 230a, diodes $D_1$ and $D_2$, a smoothing capacitor $C_f$, a Zener diode ZD, transistors $Tr_1'$ and $Tr_2'$, a capacitor $C_0$ and a resistor $R_p$. The collector voltage of the transistor $Tr_1$ is kept constant by a Zener diode ZD so that a rise of the base voltage of the transistor $Tr_1$ increases the conductivity of the transistor $Tr_1$ and decreases the conductivity of the transistor $Tr_2'$ with the resultant decrease in the current flowing through the coil $CL_3$. In the circuit 230a, an increase in the current flowing through the coil $CL_3$ promotes a voltage drop at the resistor $R_p$ at the primary side and thereby lowers the secondary voltage. A decrease in the current through the coil $CL_3$ elevates the secondary voltage. More specifically, as the base voltage of the transistor R $Tr_1$ rises, the high tension output of the circuit 230a rises to boost the deflection voltage whereby ink droplets are significantly deflected. The voltage setting circuit 260 comprises a standard code setter 260a, an up-down counter 260b and a digital-to-analog converter 260c. A standard code is set as a deflection voltage code which causes ink droplets charged to the 40th step to always impinge on the electrode 80a. In this embodiment, the counter 260b operates in an upcount mode while the electrode 80a is detecting ink droplets and counts up one pulse coupled thereto from the controller 240.

In this manner, the amount of deflection of ink droplets can be adjusted through the adjustment of ink pressure or deflection voltage if desired. It will be seen that any of these alternative adjustments is practicable with the system which causes a counter to upcount or downcount when ink droplets miss the electrode or the system which causes it to upcount or downcount when ink droplets impinge on the electrode 80a, as has been described in connection with the modification to the embodiment which adjusts the charging voltage for the same purpose. Again, such systems are selectable through the set value of a standard code and position of the electrode 80a as well as others.

While the present invention has been shown and described in connection with specific constructions and arrangements, they are not for restrictive purpose but only for illustrative purpose and various other constructions and arrangements are possible. For example, the counter 160b and standard code setter 160a of the pressure setting circuit 160 and the counter 260b and standard code setter 260a of the voltage setting circuit may be omitted altogether and their functions may be allotted to the microcomputer of the controller 240 for instance. The same holds true concerning the counter 200b, standard code setter 200a, second group of AND gates $AG_3$ and data selector 200e included in the charge signal generator 200. Additionally, the microcomputer may take charge of the function of the phase setting circuit 190.

Moreover, use may be made of an ink jet head of any other single nozzle type or multi-nozzle type in place of the head 10 shown in FIG. 1a. An example is a head having a plurality of cylindrical electrostrictive vibrators which are common in number to the nozzles and each having one ink ejection port at its leading end while being communicated with a common ink passage of the head at one end thereof. Another example is a head having cylindrical electrostrictive vibrators which are spaced from a pressurized ink box and communicated therewith by pipes and mounted on a fixed support or an ejection direction adjusting base.

Figure 6B:
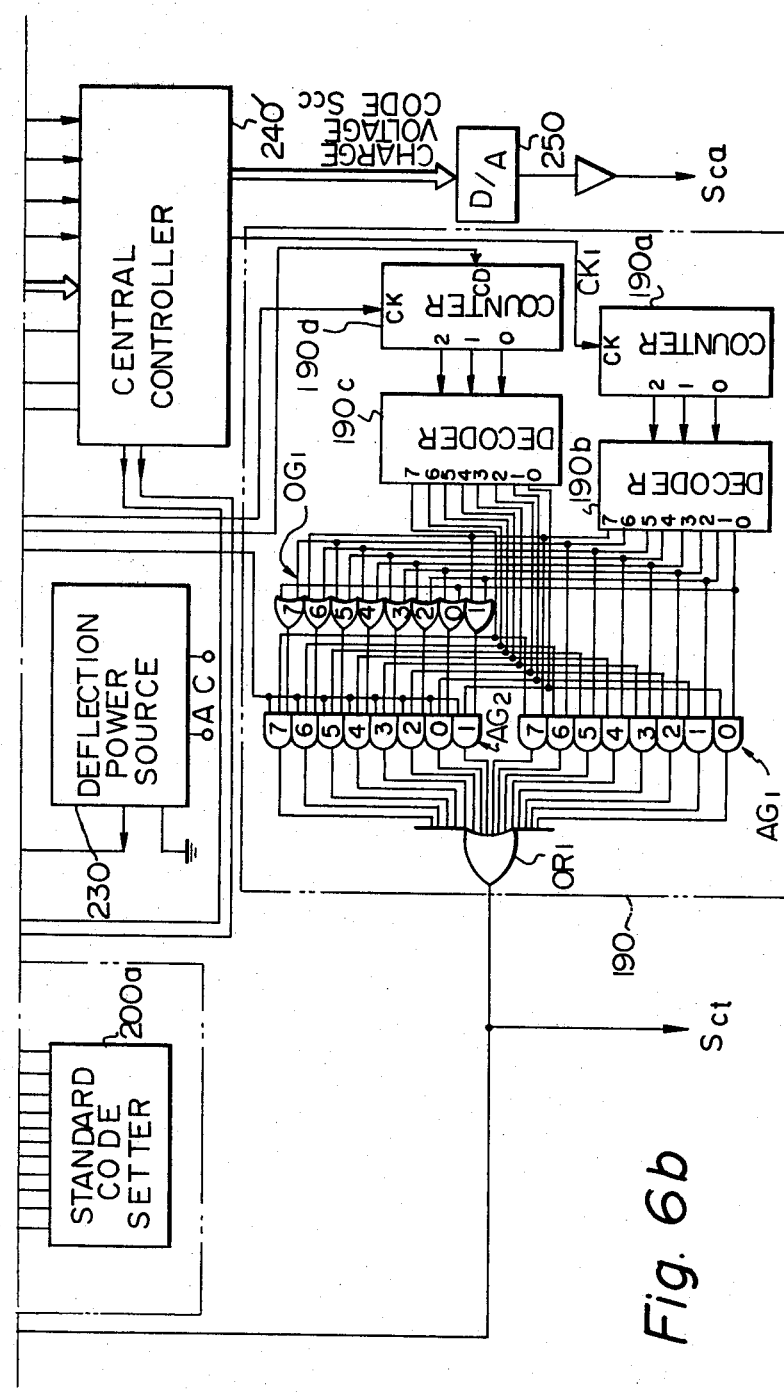
Figures 7, 7A:
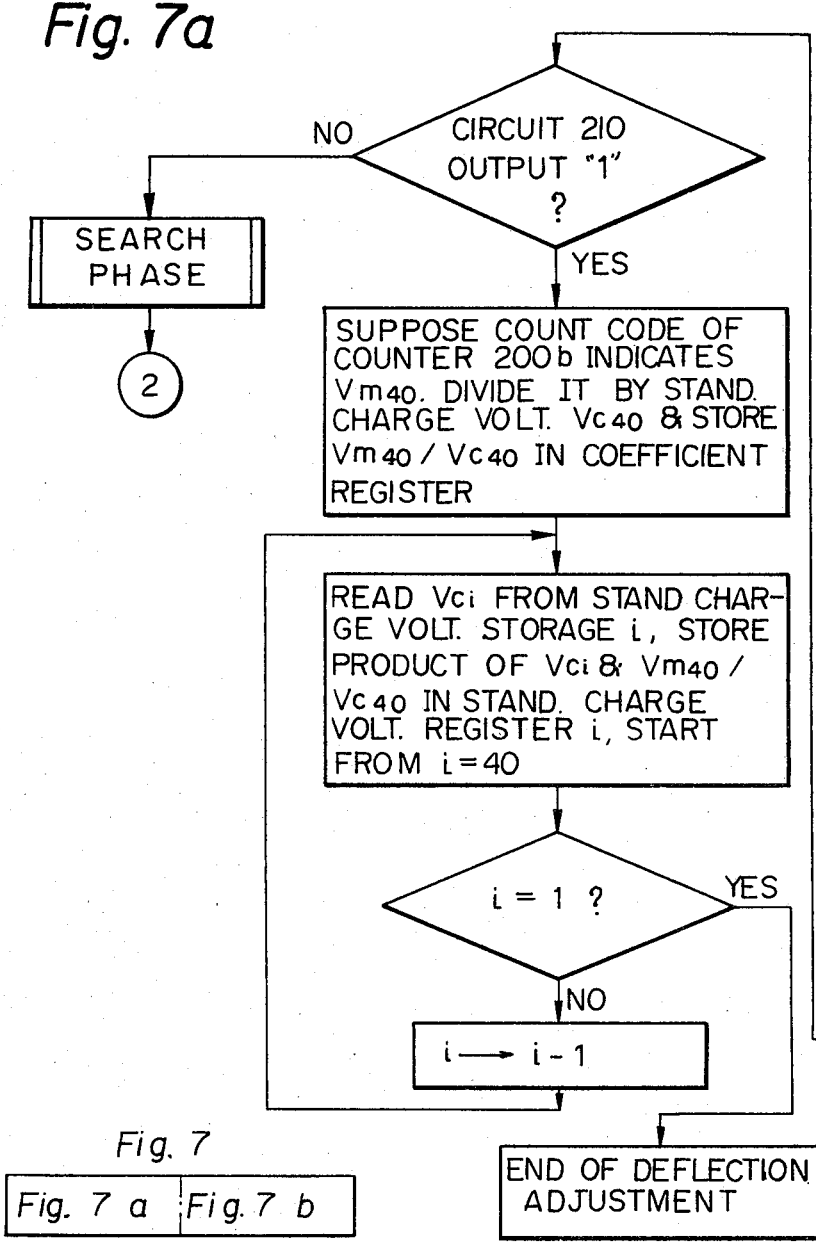
FIG. 7 is a flowchart illustrating the operation of the embodiment of FIG. 6.
Figure 7B:
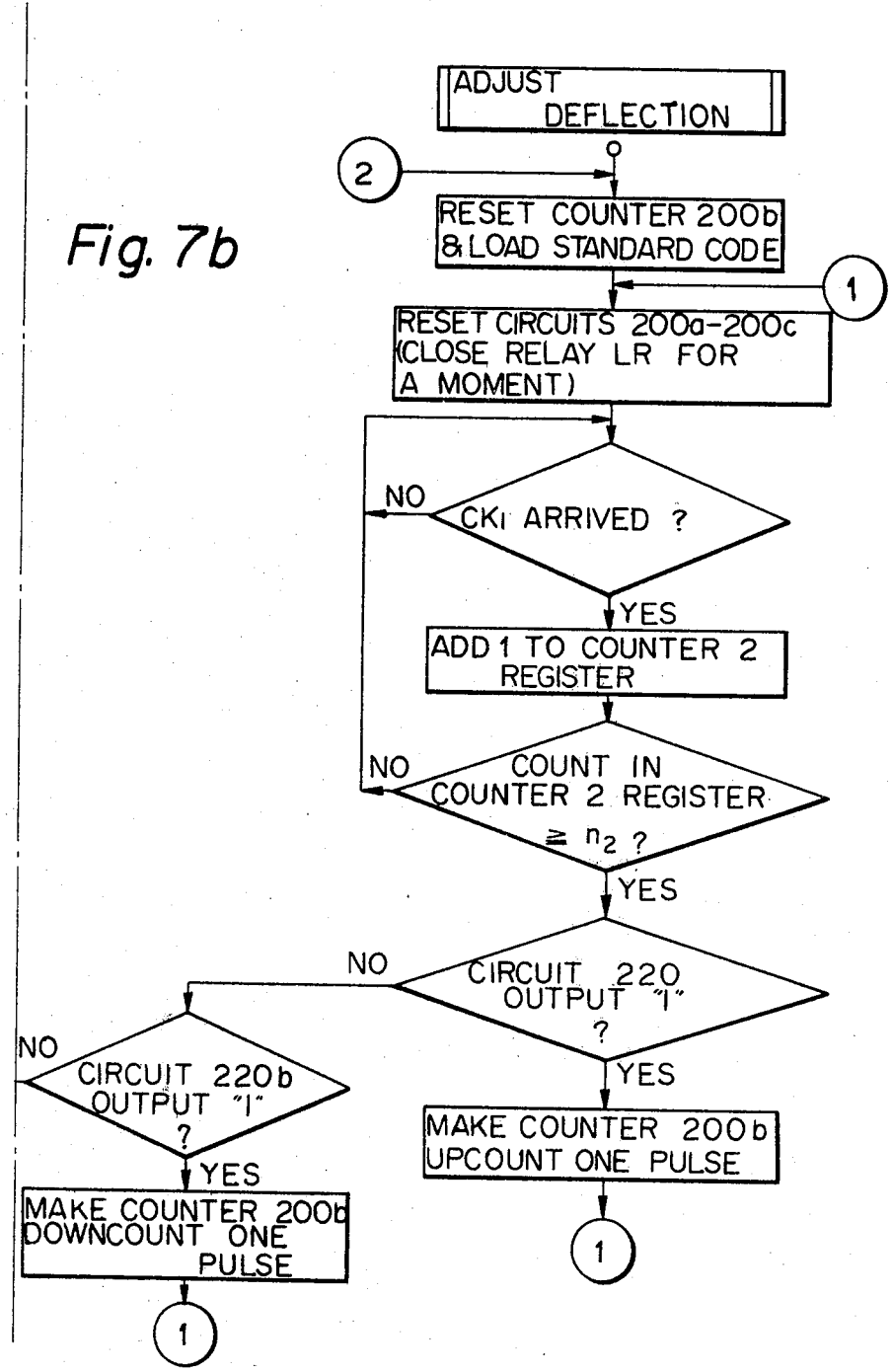

A modified embodiment of the present invention is shown in FIG. 6 with the operation thereof summarized in the form of a flow chart in FIG. 7.

An electrode unit comprises two plate-like charge detection electrodes 80a and 80b arranged such that they define an opening or gap calibrated to capture all of the ink droplets ejected from the monitor ejection hole $14a_m$ regardless of their amount of deflection while leaving a proper deflection path for the 40th level of charged ink droplets therebetween. As shown in FIG. 6 which will be referred to hereinafter, the electrode 80a is located rearwardly of the electrode 80a to define a substantial distance between their adjacent edges which defines a slit or gap in order that the two electrodes 80a and 80b may be prevented from shortcircuiting due to contamination by ink.

When a standard charging voltage is applied to the monitor charging electrode $20a_m$, ink droplets charged thereby will impinge on the electrode 80a or pass through the gap between the two electrodes 80a and 80b or impinge on the electrode 80b depending on the printing conditions of that instant. The electrodes 80a and 80b are connected with deflection detection circuits 220a and 220b individually which have integration circuits as their major components. These circuits 220a and 220b are constructed in exactly the same way.

When both of the deflection detectors 220a and 220b produce "0" outputs, ink droplets are determined as passing through the gap between the two electrodes 80a and 80b as long as they are charged. If the output level of the deflection detector 220a is "1", a central controller 240' determines that the deflection is insufficient and supplies one pulse to a counter 200b' of a monitor charge signal generator 200' while conditioning the counter 200b' for an upcount mode. If the output level of the deflection detector 220b is "1" indicating excessive deflection, the central controller 240' conditions the counter 200b' for a downcount mode and also supplies one pulse thereto. Then the central controller 240' momentarily closes or resets the relay LR of the circuit 220b and again counts the clock pulses $CK_1$. As the count of the clock pulses $CK_1$ reaches a predetermined value, the controller 240' re-checks the output levels of the deflection detectors 220a and 220b and adjusts the charging voltage by causing the counter 200$b'$ to upcount or downcount until both of the output levels of the deflection detectors 220$a$ and 220$b$ become "0". A count code of the counter 200$b'$ which appears when both of the circuits 220$a$ and 220$b$ produce "0" outputs indicates a charging voltage necessary for ejecting ink droplets to a predetermined maximum deflection position, i.e. the 40th step of charging voltage.

For the adjustment of the deflection amount, the central controller 240$'$ operates as will be described with reference to FIG. 2$c$. The controller 240$'$ first resets the counter 200$b'$ and loads it with the standard code so that the 40th step of standard charge voltage is supplied to the charging electrode 20$a_m$. The controller 240$'$ then closes the reed relays LR of the detectors 220$a$ and 220$b$ for a moment to discharge the capacitors C and starts counting the ink droplets formed. As this count increases beyond a predetermined value, the controller 240$'$ checks the output levels of the detectors 220$a$ and 220$b$. If the output level of the detector 220$a$ is "1", the controller 240$'$ conditions the counter 200$b'$ for an upcount mode and supplies it with one pulse and, if the output level of the other detector 220$b$ is "1", it causes the counter 200$b'$ to count down one pulse which it supplies. The controller 240$'$ thus closes the relays LR of the detectors 220$a$ and 220$b$ for a moment and again counts the ink droplets formed. When this count reaches a predetermined value, the controller 240$'$ checks the output levels of the detectors 220$a$ and 220$b$. Thereafter, the controller 240$'$ repeatedly causes the counter 200$b'$ to upcount or downcount, resets the detectors 220$a$ and 220$b$ and counts the ink droplets formed until both of the output levels of the detectors 220$a$ and 220$b$ become "0". Once the output levels of the detectors 220$a$ and 220$b$ commonly become "0", indicating an optimum amount of deflection, the controller 240$'$ divides the charge voltage V$_{m40}$ indicated by the count code of the counter 200$b'$ by the coefficient.

As will also be noted, the charge detecting electrodes 20$a_i$, 20$a_m$ and charge detector 210 installed in the embodiment shown in FIG. 6 may be omitted. Without these components, the controller 240$'$ in the phase search will close the relays RL of the deflection detectors 220$a$ and 220$b$ for a moment after clearing the counter 190$d$ and then start counting the droplets of ink formed. As this count reaches a predetermined value, the controller 240$'$ will check the output levels of the detectors 220$a$ and 220$b$. If either one of their outputs is "1", the controller 240$'$ completes the phase search. If both of their outputs are "0", the controller 240$'$ will reset the detectors 220$a$ and 220$b$ and feed one pulse to the counter 190$d$ and thereafter repeat this procedure until the detector 220$a$ or 220$b$ produces a "1" output. If neither one of the detectors 220$a$ and 220$b$ provides a "1" output even after the repetition of such a procedure, the controller 240$'$ will cause the counter 200$b'$ to count up or down a few pulses and then repeat the phase search discussed above.

In summary, it will be seen that the present invention provides an ink jet recording apparatus which needs only a simple construction for detecting deflection and is stable and exact in its deflection detection because it employs one or two plate-like charge detection electrodes and an integration circuit connected to the electrodes. Since the arrangement for detecting deflection positions can also serve in detecting charges for charging phase search, charge detection means between charging electrodes and deflecting electrodes can be advantageously omitted. Furthermore, as discussed in connection with the embodiments, the amount of deflection can be accurately determined and controlled stably by controlling at least one of the charge voltage, ink pressure and deflection voltage together with the detection of deflection.

Various modifications will become possible for those skilled in the art after receiving the teachings of the present disclosure without departing from the scope thereof.

What is claimed is:

1. An ink jet printing apparatus including an ink ejection head for ejecting a jet of ink, charging means for electrostatically charging the ink jet and deflection means for electrostatically deflecting the charged ink jet, characterized by comprising:
   sweep means for causing the ink jet to sweepingly deflect along an axis;
   target electrode means disposed along said axis and having an edge intersecting said axis;
   integrating circuit means connected to the target electrode means for integrating a voltage induced on the target electrode means; and
   control means for controlling the sweep means to cause the ink jet to sweepingly deflect along said axis toward said edge, sensing an output voltage of the integrating circuit means, controlling the sweep means to stop sweepingly deflecting the ink jet when the output voltage of the integrating circuit means has a predetermined value indicating that the ink jet has just passed said edge and producing an electric signal having a magnitude corresponding to an amount of deflection force which the sweep means causes to be applied to the ink jet at a time the output voltage of the integrating circuit means has the predetermined value.

2. An apparatus as in claim 1, in which the sweep means is constructed to sweepingly deflect the ink jet by controlling the charging means to vary an amount of electrostatic charge applied to the ink jet.

3. An apparatus as in claim 1, in which the sweep means is constructed to sweepingly deflect the ink jet by controlling the deflection means to vary an amount of electrostatic deflection of the ink jet.

4. An apparatus as in claim 1, further comprising pump means for supplying ink to the ink ejection head, the sweep means being constructed to sweepingly deflect the ink jet by controlling the pump means to vary an outlet pressure thereof.

5. An apparatus as in claim 1, in which the integrating circuit means comprises an integrating capacitor for integrating the voltage on the target electrode means and switch means for periodically discharging the integrating capacitor, the control means comprising timer means for sensing the output voltage of the integrating means each time a predetermined length of time has elapsed after the switch means discharges the integrating capacitor.

6. An apparatus as in claim 1, in which the sweep means is constructed to cause the ink jet to be sweepingly deflected along the target electrode means toward said edge.

7. An apparatus as in claim 1, in which the sweep means is constructed to cause the ink jet to be sweepingly deflected from an initial position external of the target electrode means toward said edge.

8. An apparatus as in claim 1, in which the target electrode means comprises a first target electrode having said edge and a second target electrode having an edge disposed closely adjacent to said edge of the first target electrode to define a gap therebetween.

9. An apparatus as in claim 8, in which the integrating circuit means and the control means are connected to the first and second target electrodes, the control means controlling the sweep means, in response to an output of the integrating circuit means indicating that the ink jet is hitting one of the first and second target electrodes, to cause the ink jet to sweepingly deflect along said axis in a respective direction toward said gap.

10. An apparatus as in claim 9, in which the control means comprises an up-down counter and means for controlling the amount of deflection force applied to the ink jet in accordance with a count in the counter and means for causing the counter to count up when the ink jet is hitting the first target electrode and to count down when the ink jet is hitting the second target electrode.

11. An apparatus as in claim 1, in which the deflection means comprises deflection electrode means and staircase generator means for applying a staircase signal to the deflection electrode means, the control means controlling an amplification factor of the staircase signal in accordance with a magnitude of said electric signal corresponding to the amount of deflection force applied to the ink jet.

* * * * *